US005091858A

United States Patent [19]

Paielli

[11] Patent Number: 5,091,858

[45] Date of Patent: Feb. 25, 1992

[54] ELECTRONIC CONTROL OF ENGINE FUEL DELIVERY

[75] Inventor: Perry M. Paielli, Milford, Mich.

[73] Assignee: Digital Fuel Injection, Farmington Hills, Mich.

[21] Appl. No.: 429,789

[22] Filed: Oct. 26, 1989

Related U.S. Application Data

[63] Continuation-in-part of Ser. No. 296,218, Jan. 9, 1989, abandoned.

[51] Int. Cl.[5] .............................................. G06F 15/20

[52] U.S. Cl. .......................... 364/431.12; 364/431.04; 123/480

[58] Field of Search ........................ 364/431.1–431.04, 364/900, 200; 123/480; 365/228, 230.01

[56] References Cited

U.S. PATENT DOCUMENTS

| | | | |
|---|---|---|---|
| 4,084,240 | 4/1978 | Lappington | 364/431.12 |
| 4,348,729 | 9/1982 | Sasayama et al. | 364/431.12 |
| 4,366,541 | 12/1982 | Mouri et al. | 364/431.12 |
| 4,677,558 | 6/1987 | Böhmler et al. | 364/431.12 |
| 4,730,256 | 3/1988 | Niimi et al. | 364/431.12 |
| 4,751,633 | 6/1988 | Henn et al. | 364/421.12 |
| 4,908,792 | 3/1990 | Przybyla et al. | 364/431.12 |

FOREIGN PATENT DOCUMENTS

| | | | |
|---|---|---|---|
| 0162104 | 12/1980 | Japan | 364/431.12 |

*Primary Examiner*—Parshotham S. Lall
*Assistant Examiner*—V. N. Trans
*Attorney, Agent, or Firm*—Barnes, Kisselle, Raisch, Choate, Whittemore & Hulbert

[57] ABSTRACT

An engine fuel delivery control system includes an engine having at least one fuel injector fuel injector responsive to electronic control signals for delivering fuel to the engine cylinders and a plurality of sensor for supplying electrical sensor signals as various functions of engine operating conditions. An electronic engine control unit includes an electronic memory storing engine control parameters in a variety of look-up tables, a microprocessor-based controller for periodically addressing the memory tables and obtaining required control parameters as a function of sensor signal inputs, and circuitry for supplying control signals to the injectors as a predetermined function of the control parameters obtained from the look-up tables. Apparatus for selectively varying the control parameters in the look-up tables includes facility for up-loading selected tables from the engine control unit memory, monitoring engine operation as reflected by addressing of the parameter tables in real time, and selectively initiating a programming mode of operation. In such programming mode of operation, addressing of the control tables is inhibited in the electronic control unit, and the control parameters obtained from the tables immediately prior to onset of the programming mode of operation are employed to supply control signals to the injectors during the programming mode of operation. In this way, engine operation continues uninterrupted during the programming mode of operation.

23 Claims, 18 Drawing Sheets

ELECTRONIC CONTROL OF ENGINE FUEL DELIVERY

This application is a continuation-in-part of application Ser. No. 07/296,218 filed Jan. 9, 1989 now abandoned. The disclosure of such application is incorporated herein by reference.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

Reference is made to a microfiche appendix that accompanies this application, consisting of one sheet of fiche containing forty-eight frames.

The present invention is directed to electronic control of engines, and more particularly to electronic engine control with external reprogrammability of control variables. Yet more specifically, the invention relates to a method and apparatus for reprogrammable control of engine fuel delivery.

BACKGROUND AND OBJECTS OF THE INVENTION

Electronic control of engines for automotive and related applications has become more precise and sophisticated as fuel economy and environmental regulations have become more stringent. Most control schemes involve calculation of controllable variables in real time based upon prestored constants and inputs from sensors that monitor engine operation. U.S Pat. No. 4,551,803 is exemplary of systems of this type, in which variation of the control process involves adjustable control of the equation constants. Calculations are employed in both open-loop operation during warm-up of the engine, and in closed-loop operation under normal operating conditions when an oxygen sensor in the engine exhaust is employed for sensing engine air/fuel ratio. A problem with control schemes of this character lies in the time required to calculate the controllable variables based upon the sensor inputs and prestored constants.

To help alleviate the time constraints of this variable calculation technique, it has been proposed to employ look-up tables rather than time-consuming calculations to obtain control parameters during engine operation. Initially, it was proposed to employ look-up tables in open-loop control during engine warm-up. A serious problem and limitation of such systems lies in the requirement that the tables be permanently stored in a programmable read-only-memory or PROM that is initially programmed at the factory, and that requires removal and replacement to change or reprogram any of the stored control variables. Although such requirement for removal and replacement at a factory service facility or the like has been considered to be acceptable for normal passenger car and light truck applications in view of EPA requirements that critical engine control parameters not be variable outside of an authorized service environment, such schemes are unacceptable for racing and other off-road applications, and in development and test environments. In applications of these types, it is necessary that the control variables be readily, individually and selectively reprogrammable by a technician or other operator at the site.

U.S. Pat. No. 4,751,633 discloses an engine control system that employs look-up tables in an EEPROM during both warm-up and normal operation. An external programming unit allows reprogramming of the system memory, without requiring removal of the memory package, to accommodate specific vehicle conditions, such as fuel quality, climate, etc. No provision is made for selective variation of table control parameters in memory during actual engine operation.

It is therefore a general object of the present invention to provide a system and method for electronic control of engine operation that features enhanced reprogrammability of engine control variables. Another and more specific object of the invention is to provide a method and apparatus for electronic engine control in which the engine control variables may be readily and selectively varied in real time without interrupting engine operation, so that the operator may readily observe the effects of parameter variation and make any desired further adjustments without necessitating removal of table memory or other electronic circuitry. Yet another object of the present invention is to provide a system and method of the described character in which the control variable tables are displayed to an operator in such a way as to facilitate selective variation of the control parameters, and in which various control tables may be stored externally of the engine for later reuse as desired. A further and yet more specific object of the invention is to provide a method and system for enhanced flexible electronic control of fuel delivery to an internal combustion engine.

SUMMARY OF THE INVENTION

An engine control system in accordance with the present invention includes an engine having at least one mechanism responsive to electronic control signals for affecting engine operation and at least one sensor for supplying electrical sensor signals as a function of engine operating conditions. An electronic engine control unit includes a non-volatile electronic memory storing engine control parameters in a lookup table, a microprocessor-based controller for periodically addressing the memory and obtaining control parameters as a function of sensor signal inputs, and circuitry for supplying control signals to the engine-control mechanism as a predetermined function of the control parameters obtained from the look-up table. Apparatus for selectively varying the control parameters in the look-up table includes facility for up-loading selected tables from the engine control unit memory, monitoring engine operation as reflected by addressing of the parameter table in real time, and selectively initiating a programming mode of operation. In such programming mode of operation, addressing of the control table is inhibited in the electronic control unit, and the control parameters obtained from the table immediately prior to onset of the programming mode of operation are employed to supply control signals to the engine control mechanism during the programming mode of operation, so that engine operation continues uninterrupted during the programming mode of operation.

In the preferred embodiment of the invention, the table programming apparatus comprises a programmed personal computer that includes a screen for displaying the selected control table to an operator, with cursors or the like movable around the display under control of an operator keyboard for identifying specific table parameters of interest. Upon desired alteration of selected control parameters at the table display, the revised table data is downloaded from the reprogramming apparatus to the engine control unit memory for use in controlling engine operation upon termination of the reprogramming mode of operation. In a specific application of the invention disclosed in the present application, the electronic control unit includes multiple tables for controlling fuel delivery to the engine during various stages or phases of engine operation, and the reprogramming apparatus includes menu-driven facility for selectively reading, displaying and reprogramming the various tables as desired by the operator. The main table is a three-dimensional table of base fuel injector pulse width parameters addressable by engine speed and engine air manifold absolute pressure. Various support tables are two-dimensional tables that tailor injector pulse duration to engine temperature during such transient operating stages as engine cranking, idle, warmup and acceleration, and are displayed to the operator in readily readable and understandable graphic format. In all modes of operation, actual engine operating conditions are displayed to the operator for objective evaluation of engine operation, in addition to subjective evaluation through observation of the engine itself.

A particularly important advantage of the present invention lies in the fact that the invention may be employed to tune engine operation as the engine continues to run. Thus, during vehicle test on a track or the like, a technician in the vehicle may employ the invention in a lap-top computer for varying engine control parameters and observing the results in terms of engine operation under a variety of test conditions. Other features of the invention lie in the fact that the reprogramming apparatus is user-friendly, and in the fact that it may be readily employed in conjunction with a variety of engine sizes and types. Further, operating tables may be readily stored for later reference or use as desired.

Although the invention will be described in conjunction with a presently preferred embodiment thereof for implementing and reprogramming engine fuel delivery maps and tables, it will be recognized and appreciated that the principles of the invention may be employed in a variety of other engine-control applications, such as in conjunction with selective programming of spark, fuel pump and manifold air bypass control tables.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
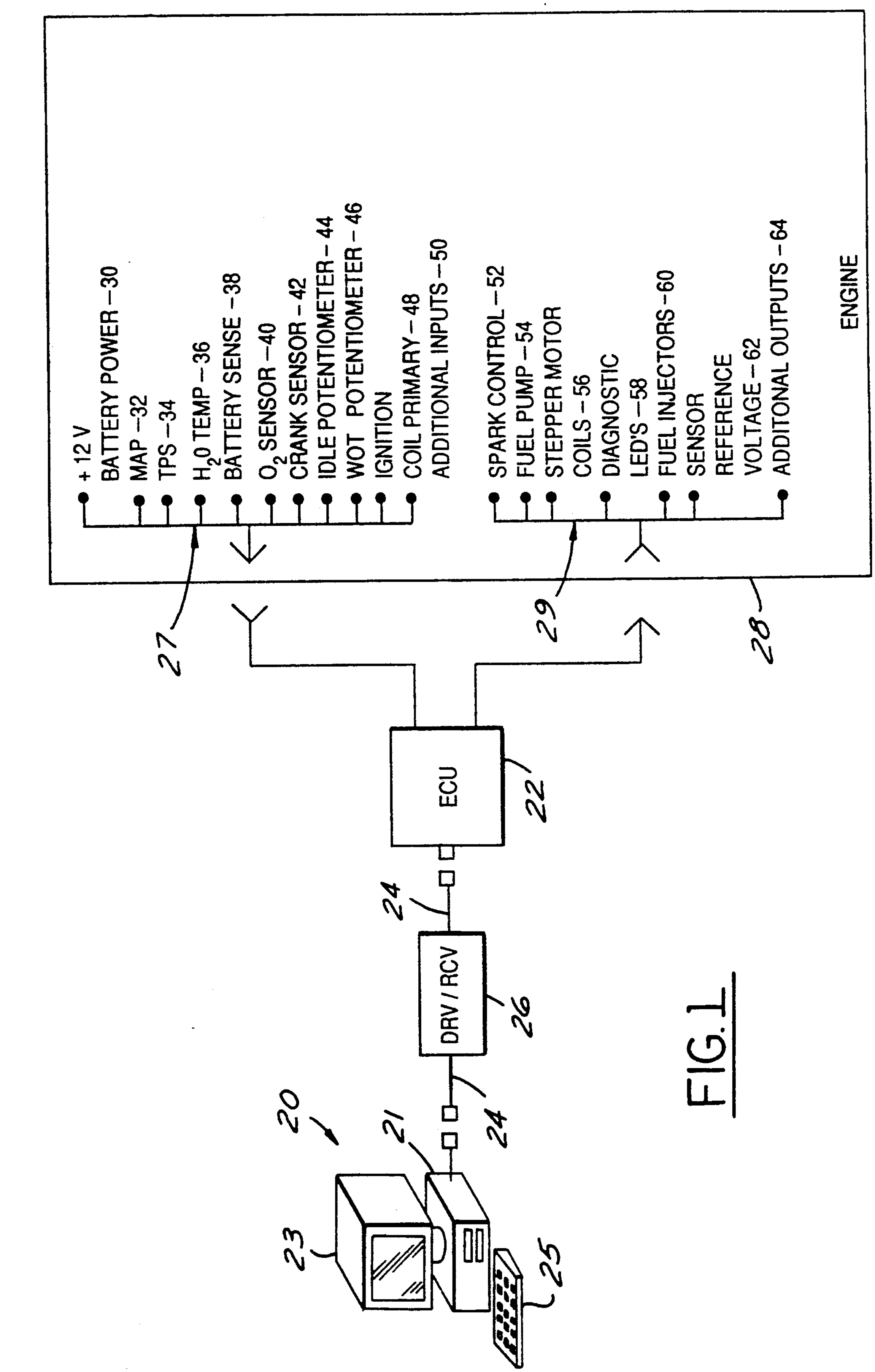
FIG. 1 is a functional block diagram of an engine control system in accordance with a presently preferred embodiment of the invention.

FIG. 1 illustrates an engine control system in accordance with a presently preferred embodiment of the invention as comprising an internal combustion engine 28 that carries a plurality of electrically controlled mechanisms 29 for affecting engine operation, and a plurality of sensors 27 for providing electrical signals as corresponding functions of engine operating conditions. An electronic control unit or ECU 22 receives input signals from sensors 27 and provides output signals to control operation of mechanisms 29. ECU 22 is also selectively connectable to programming apparatus 20 through a cable 24 that includes a driver/receiver interface 26. Apparatus 20 preferably takes the form of a personal computer, including a console 21 having suitable disk drives and carrying a display screen 23. An operator keyboard 25 is connected to console 21 for controlling operation of computer 20.

Sensors 27 on engine 28 include an engine air intake manifold absolute pressure or MAP sensor 32 that indicates air pressure within the engine air intake manifold, which is indicative of engine load. Battery power 30 is fed to ECU 22. A throttle position sensor or TPS 34 indicates the degree of rotation of the engine throttle under control of the operator. A water temperature sensor 36 provides an indication of engine operating temperature, and a sensor 38 indicates actual voltage potential of the engine battery. An oxygen sensor 40 is positioned in the engine exhaust and provides a signal to ECU 22 from which the ECU determines the richness and leanness of the air/fuel mixture entering the cylinders. A crank sensor 42 indicates rotation of the engine crankshaft by the starter motor. An idle potentiometer 44 and a wide-open throttle or wot potentiometer 46 allows the operator to make small adjustments in the idle and wide-open throttle characteristics of the engine. A sensor 48 is coupled to the ignition coil primary and feeds a signal to ECU 22 from which engine speed is determined. Additional sensors 50 may be connected to ECU 22 as desired.

Mechanisms 29 that affect and control operation of engine 28 include a spark controller 52 for controlling ignition timing of the engine. A fuel pump 54 is controlled by ECU 22 to feed fuel from a tank or supply (not shown) to the injectors of engine 28 while maintaining constant pressure at the injectors and/or constant pressure differential across the injectors. A stepper motor 56 is coupled to the manifold air bypass of engine 28 for adjusting idle speed. ECU 22 is also connected to a plurality of LEDs 58 on an operator console or panel to indicate any fault or warning conditions to the operator. A plurality of fuel injectors 60 receive pulsed signals from ECU 22 of controlled time duration for injecting desired quantities of fuel to the air manifold adjacent to the cylinder intake ports. ECU 22 provides a sensor reference voltage 62 to the various sensors, and is connected at engine 28 to such additional outputs 64 as are desired. Sensors 27 and mechanisms 29 may be of any suitable conventional type.

Figure 2:
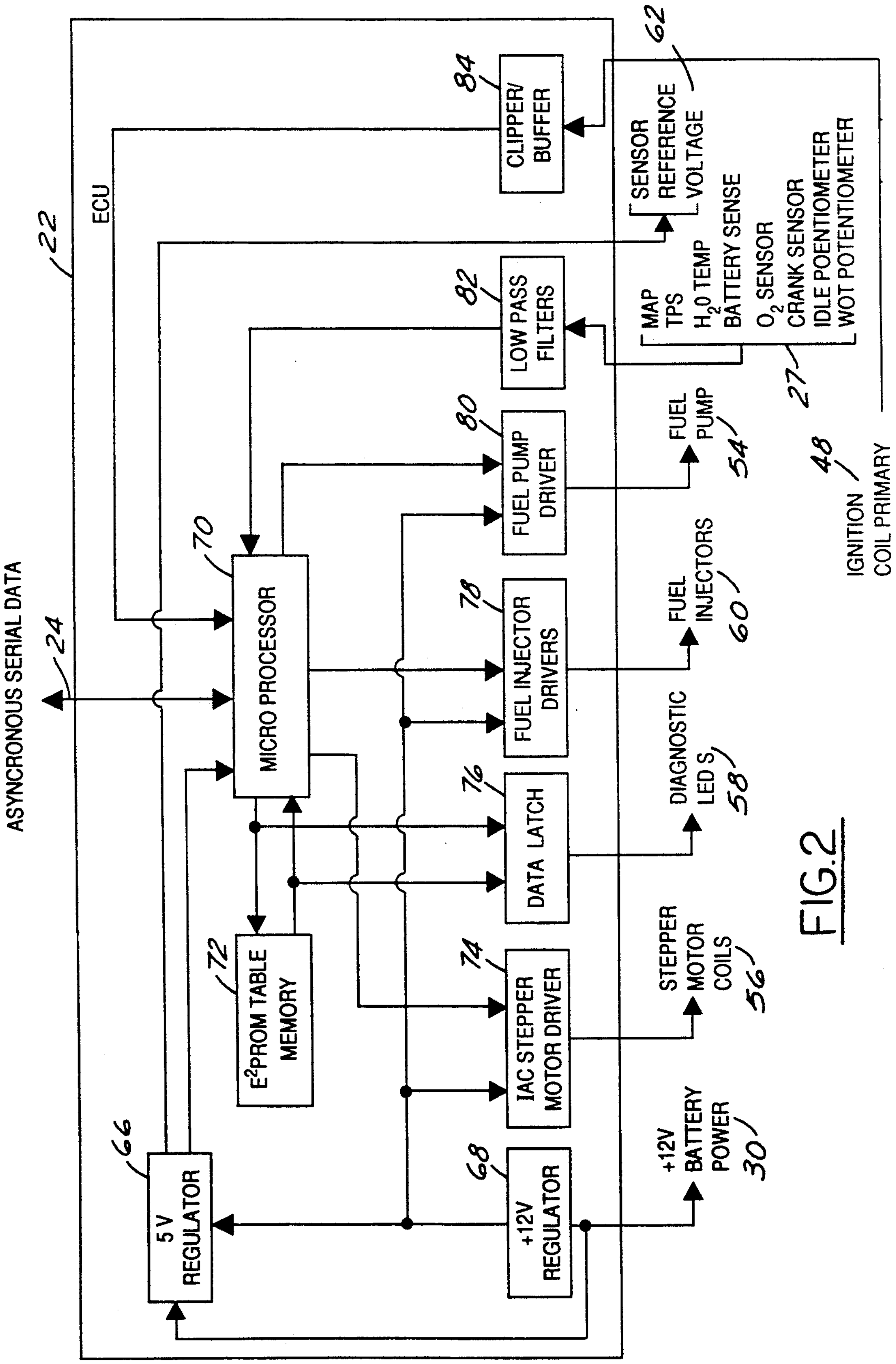
FIG. 2 is a functional block diagram of the engine control unit or ECU in FIG. 1.

FIG. 2 illustrates ECU 22 in greater detail. A control microprocessor 70 receives inputs from the various sensors 27 through associated low pass filters 82, and an input from the ignition primary coil sensor 48 through a clipper/buffer 84. Battery power is connected to a +12 volt d.c. regulator 68 for supplying power to a stepper motor driver 74, fuel injector drivers 78 and a fuel pump driver 80. The control inputs to drivers 74, 78 and 80 are provided by microprocessor 70. A +5 volt d.c. regulator 66 receives input power from battery 30, and supplies power to microprocessor 70 and reference voltage 62. An electronically erasable programmable read-only-memory or EEPROM 72 is connected to microprocessor 70 for storage of the various engine control tables or maps as will be described. Control programming for microprocessor 70 may be stored in EEPROM 72 or in separate memory. A data latch 76 is connected to microprocessor 70 and EEPROM 72 for driving diagnostic LEDs 58. Spark control 52 (FIG. 1) is likewise coupled to microprocessor 70 through a suitable driver (not shown). An I/O port of microprocessor 70 is also connected to external cable 24.

Figure 26:
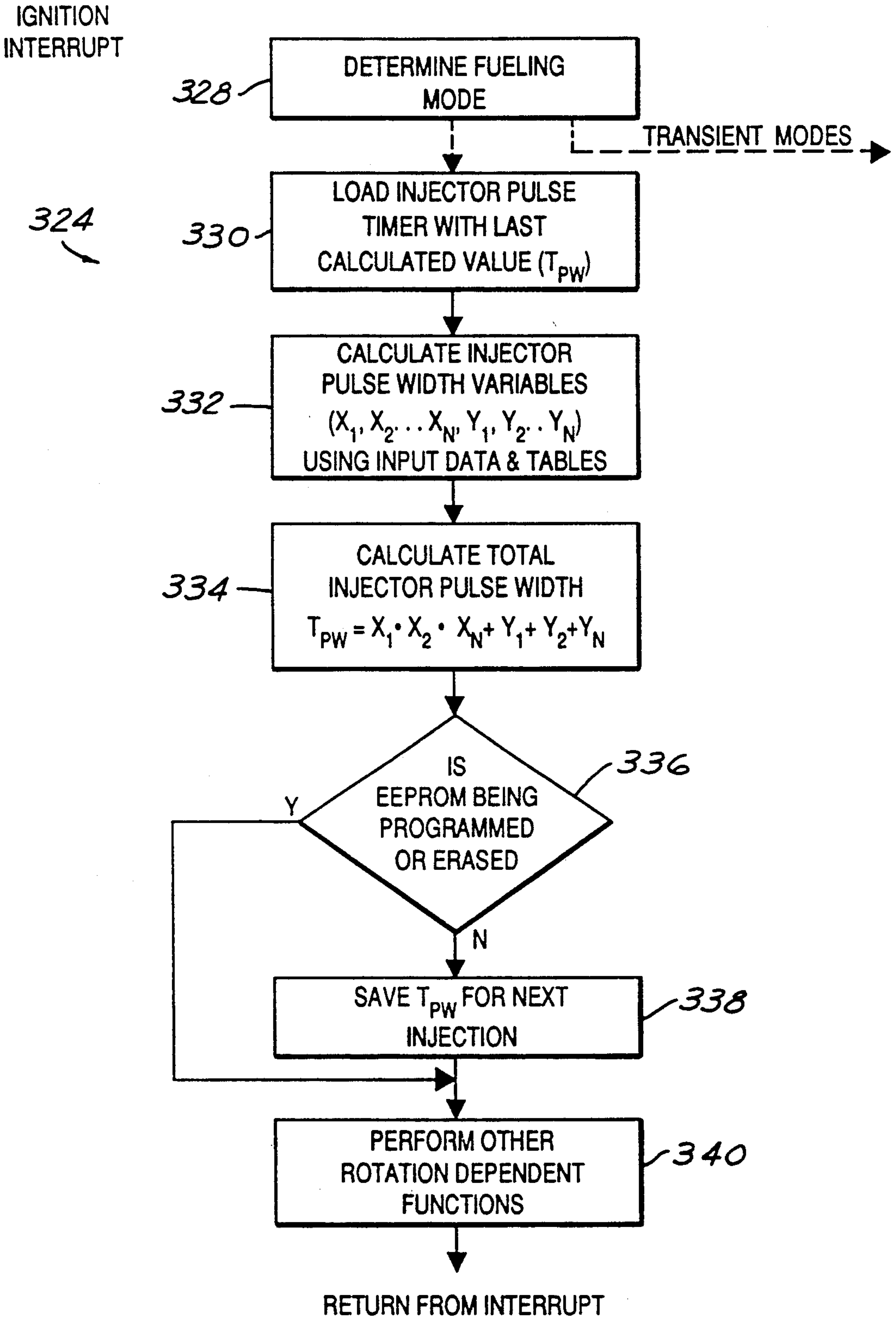
FIG. 26 is a flow chart that illustrates the ignition interrupt routine in the ECU during steady-state engine operation.

Operation of programming computer 20 will be discussed in detail in conjunction with the flow chart of FIGS. 3A and 3B, and the screen displays of FIGS. 4–24. Source code for programming computer 20 to function as will be described accompanies the application as frames 3–42 of the microfiche appendix. Operation of ECU 22 for driving fuel injectors 60 during normal operation will be discussed in conjunction with FIG. 26. Likewise, operation of ECU 22 for communication with programming computer 20 and downloading tables therefrom into EEPROM 72 will be discussed in conjunction with FIG. 27. Code for programming a type 68HC11A1 microprocessor 70 to function as so described in conjunction with FIGS. 26 and 27 is illustrated at frames 43–48 of the microfiche appendix.

Upon initialization of programming computer 20, and after setting preliminary variables, the main or root system menu 100 (FIGS. 3A and 4) is displayed at screen 23 (FIG. 1). In main menu 100, the operator is given the option of selecting among the various maps or tables of ECU 22 for monitoring and/or editing. These options include the base fuel map 94 (FIGS. 3B and 4), the cranking fuel table 92 (FIGS. 3A and 4), the idle speed control table 86, the after-start enrichment table 90, the warm-up enrichment table 88, the acceleration enrichment table 160 (FIG. 4) or the global table storage function 162. A cursor 164 on screen menu 100 is manipulated using the up and down arrow keys on keyboard 25 (FIG. 1) to overlie the selected menu selection, and the ENTER key is depressed to make the selection. Monitoring and editing of each of the menu functions in main menu 100 (FIG. 4) will be discussed as follows: base fuel map option 94 in conjunction with FIGS. 3B–7, cranking fuel option 92 in conjunction with FIGS. 3A and 8–9, idle speed fuel option 86 in conjunction with FIGS. 3A and 10–13, after-start fuel option 90 in conjunction with FIGS. 3A and 14–17, warm-up enrichment fuel option 88 in conjunction with FIGS. 3A and 18–19, acceleration enrichment fuel option 160 in conjunction with FIGS. 20–22, and global storage and monitoring function 162 in conjunction with FIGS. 23–24.

Upon selection of base fuel map function 94 (FIG. 4), a fuel map sub-menu 110 (FIGS. 3B and 5) is displayed on screen 23. The operator is given the option 166 (FIGS. 3B and 5) of programming the base fuel map in ECU EEPROM 72 (FIG. 2) from a fuel map previously stored in the computer disk file, the option 168 of saving the base fuel map currently in ECU EEPROM 72 in a file for future reference, the option 170 of monitoring and/or editing the ECU fuel map whether the engine is operating or idle, and the option 172 of graphing the base fuel map or table in a three dimensional display. If the operator selects (166) to program the base fuel map from a pre-existing file, the operator is first asked to identify the file by title, whereupon that file is obtained at 130 (FIG. 3B) from computer memory and downloaded at 132 to ECU EEPROM 72. If the operator selects option 168 for saving the current ECU base fuel map to a file, by manipulation of cursor 164 (FIG. 4) and depression of the ENTER key, the ECU fuel map in EEPROM 72 is uploaded at 131 into computer 20 and saved at 128 in a computer file under a file name selected by the operator.

Figure 6:
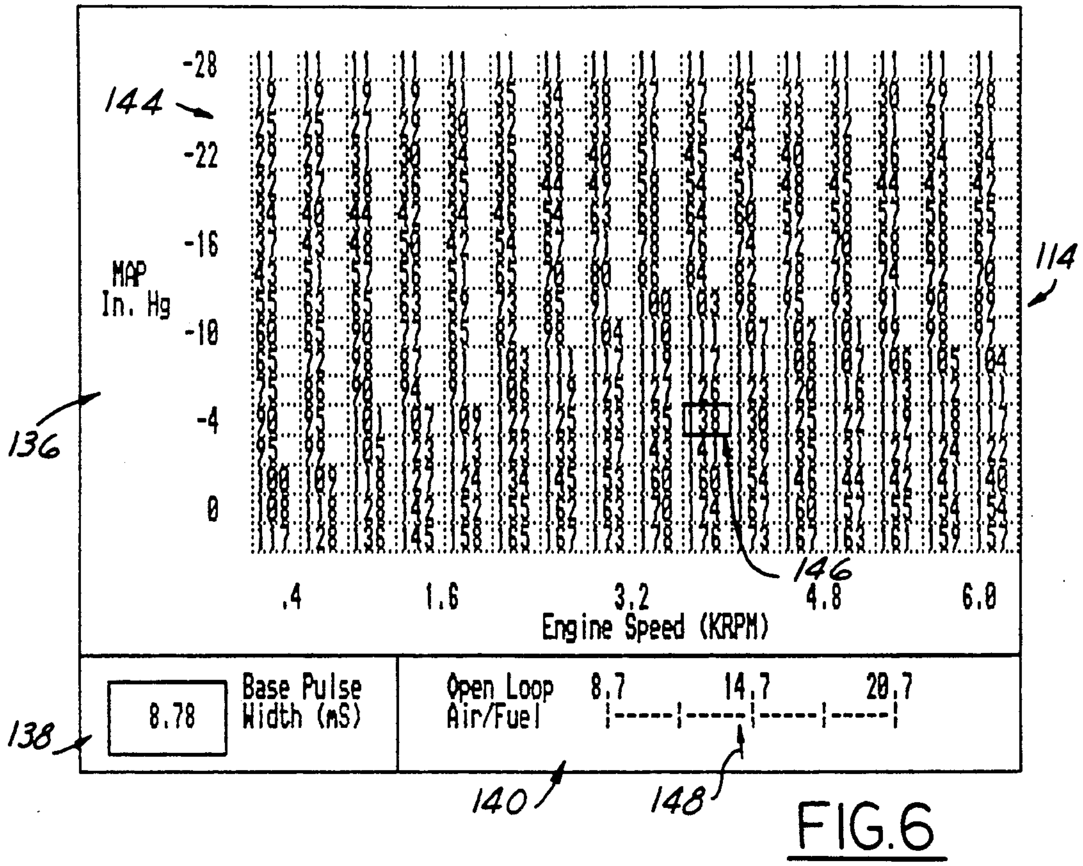
FIG. 6 illustrates display of the main or base fuel map or table on the apparatus screen.

Selection of option 137 (FIG. 3B and 5) for monitoring and editing the ECU base fuel map causes computer 20 to read the ECU fuel map at 112 (FIG. 3B) from EEPROM 72, and then to display the fuel map at 114 on computer screen 23. This fuel map display is illustrated in FIG. 6. Display 100 takes the form of three display windows 136, 138, 140. Within window 136, is a matrix 144 of numeric parameters that form the ECU's base fuel map. In the illustrated embodiment of the invention, there are seventeen rows and sixteen columns in tabular matrix 144. The rows correspond to manifold absolute pressure and the columns to engine speed in thousands of RPM. For naturally aspirated engines, the fuel map vertical scale would typically be from −28 to zero inches of mercury as illustrated. If the engine is set for positive manifold pressure—i.e., turbocharging—the vertical scale would be from +15 to −15 psi. The horizontal scale is from 400 to 6,000 RPM. Each element or cell of matrix 144 contains an integer that, when multiplied by 0.0627, yields an injector base pulse width. In the monitoring mode of operation, when display 144 is initially presented, a cursor 146 overlies the cell at which the engine is currently operating, and the corresponding base pulse width in milliseconds appears in window 138 at the lower left corner of display 114. Thus, in the specific example illustrated in FIG. 6, the engine is operating at approximately 3600 RPM at a manifold pressure of −4 in. Hg, yielding a base pulse width of 8.78 milliseconds. If the engine and ECU are running closed loop—i.e., with oxygen sensor 40 (FIG. 1) being monitored for setting of optimum air/fuel ratio—the open loop air/fuel scale in window 140 at the lower right portion of the screen will show a bar 148 positioned beneath the scale. This bar, which only appears after the engine has reached at least approximately 100° F. and the engine speed is greater than 1200 RPM (these parameters are reprogrammable), shows what the engines air/fuel mixture would be under the particular conditions at which the engine is operating, based on exhaust oxygen sensor output, if the engine were running open loop. When running closed loop, ECU microprocessor 70 maintains an air/fuel mixture of 14.7:1 by adjusting fuel flow for stoichiometry. In closed-loop operation, air/fuel bar 148 thus indicates the amount the ECU must compensate the base fuel flow to achieve an 14.7:1 air/fuel mixture.

To exit the fuel map monitoring mode 116 (FIG. 3B) and enter the editing mode 118, 120, the E key is depressed at keyboard 25 (FIG. 1). The operator may return to the monitoring mode from the enter mode by depression of the Q key, and may return to fuel map sub-menu 110 from the monitoring mode by depression of the Q key. In the editing mode, cursor 138 no longer flashes. The cursor may be moved vertically and horizontally by operator manipulation of the arrow keys until overlying a matrix cell at which the numeric parameter is to be changed. At the same time, window 138 displays the base pulse width milliseconds associated with the numeric parameter in the cell that cursor 146 overlies. A new number (integer) may be placed in any cell by entering the number at keyboard 25 (FIG. 1) and depressing the ENTER key. The corresponding pulse width will appear in window 138. For example, if it is determined that the engine is slightly lean at some speed and manifold pressure, the base fuel map may be edited at the corresponding cell to increase quantity of fuel delivered. After adding about ten percent to the cell value, for example, the engine may be run at the noted conditions to see if desired performance has been obtained. Several iterations may be required to obtain desired performance.

Figure 7:
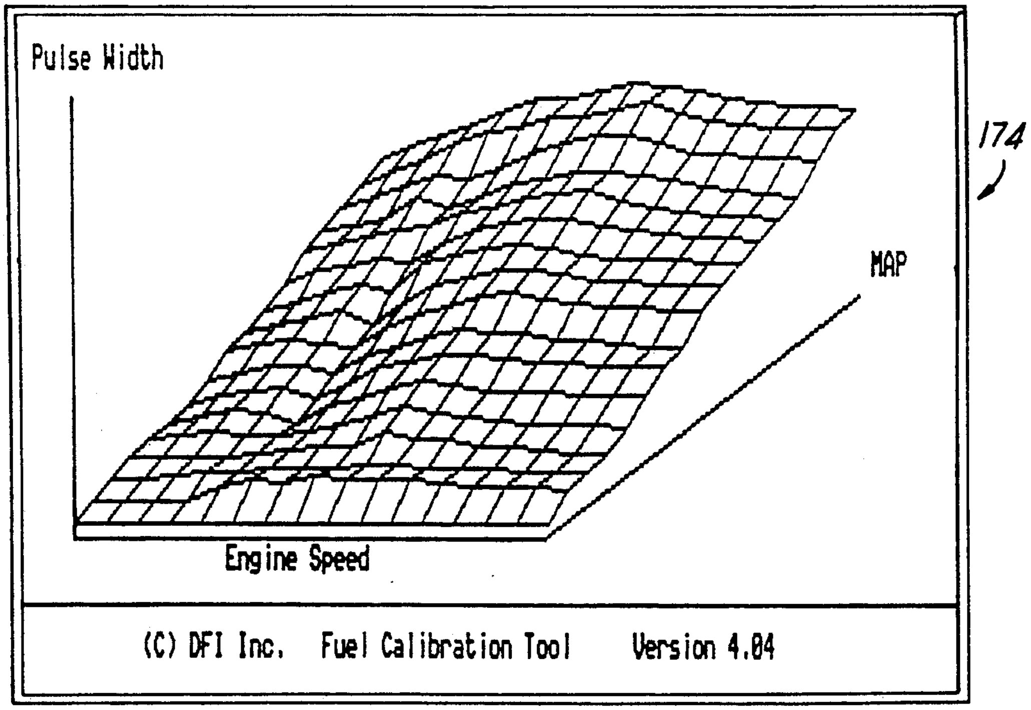
FIGS. 7, 9, 11–13, 15–17, 19 and 21–22 illustrate display of other control maps or tables on the apparatus screen during operation of the invention.

At fuel map sub-menu 110 (FIGS. 3B and 5), the operator may select option 172 to graph the base fuel map. The ECU fuel map is then read at 124 from EEPROM 72 and displayed at 174 (FIGS. 3B and 7). This three dimensional plot of the base fuel map is useful for identifying severe discontinuities or irregularities in the base fuel map that may otherwise go unnoticed in the numeric table of FIG. 6. To edit the fuel map, the ENTER key is depressed to return to fuel map sub-menu 110 (FIG. 5), and base fuel map option 170 is reselected for editing as previously described.

Figure 8:
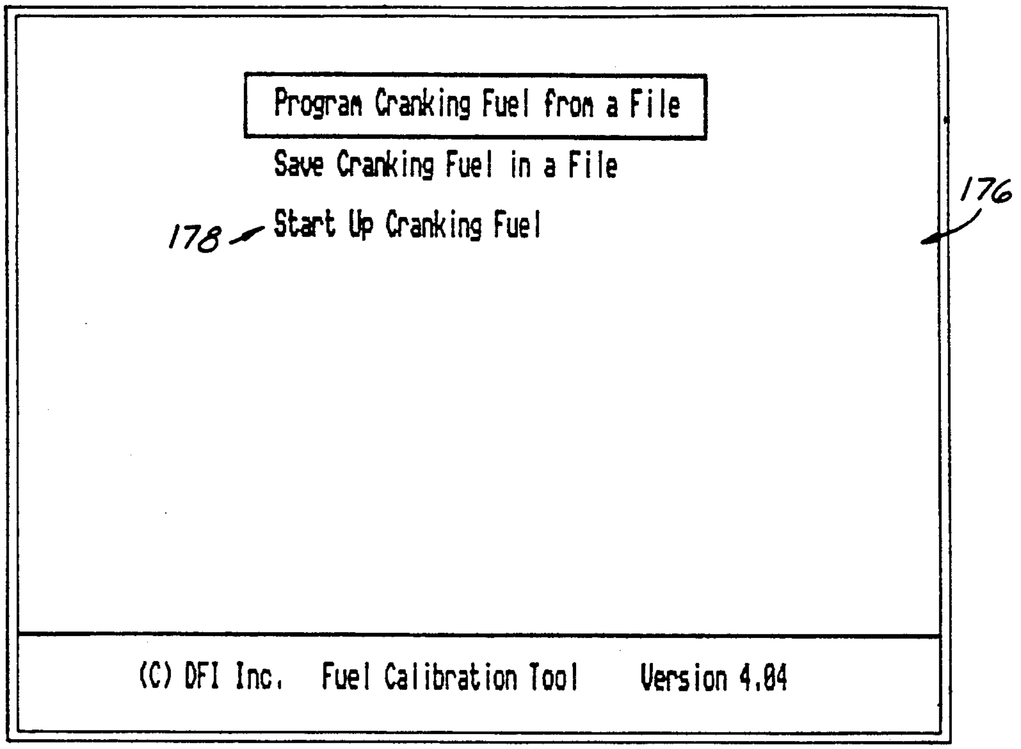
Figure 9:
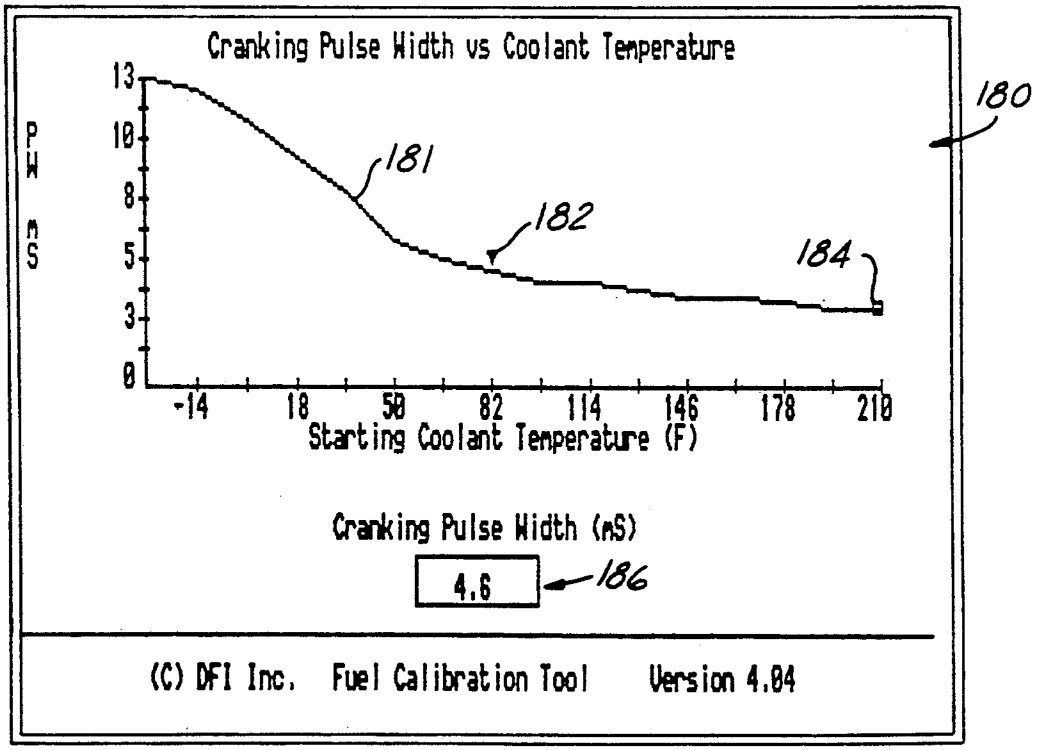
Figure 10:
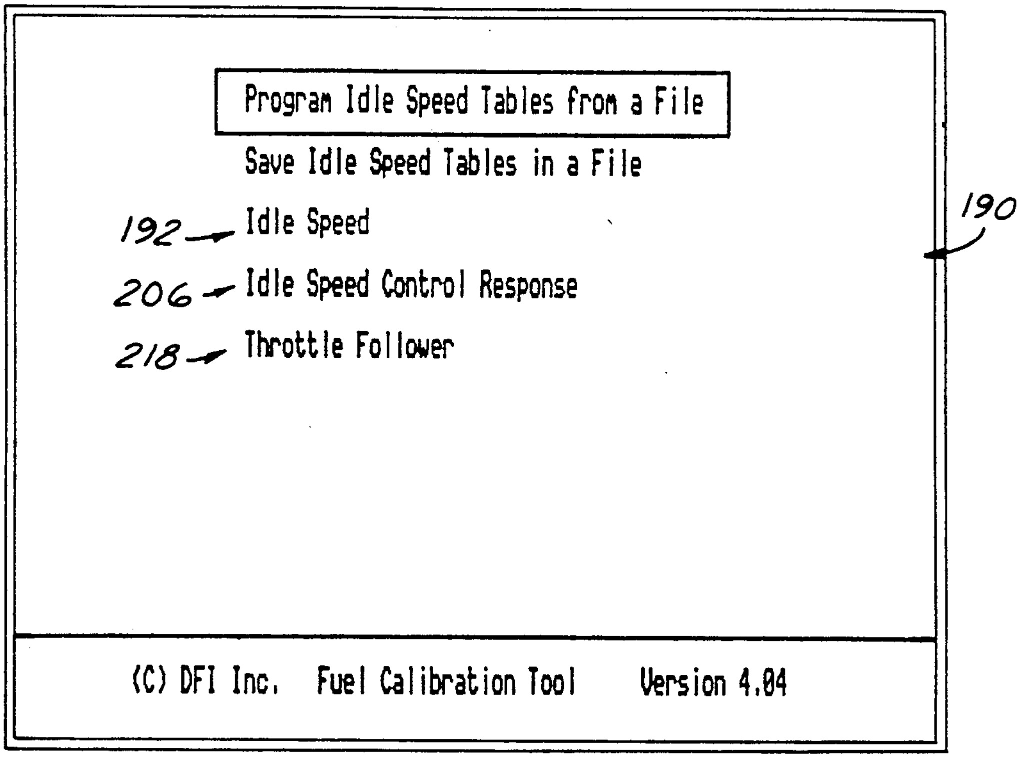
Figure 11:
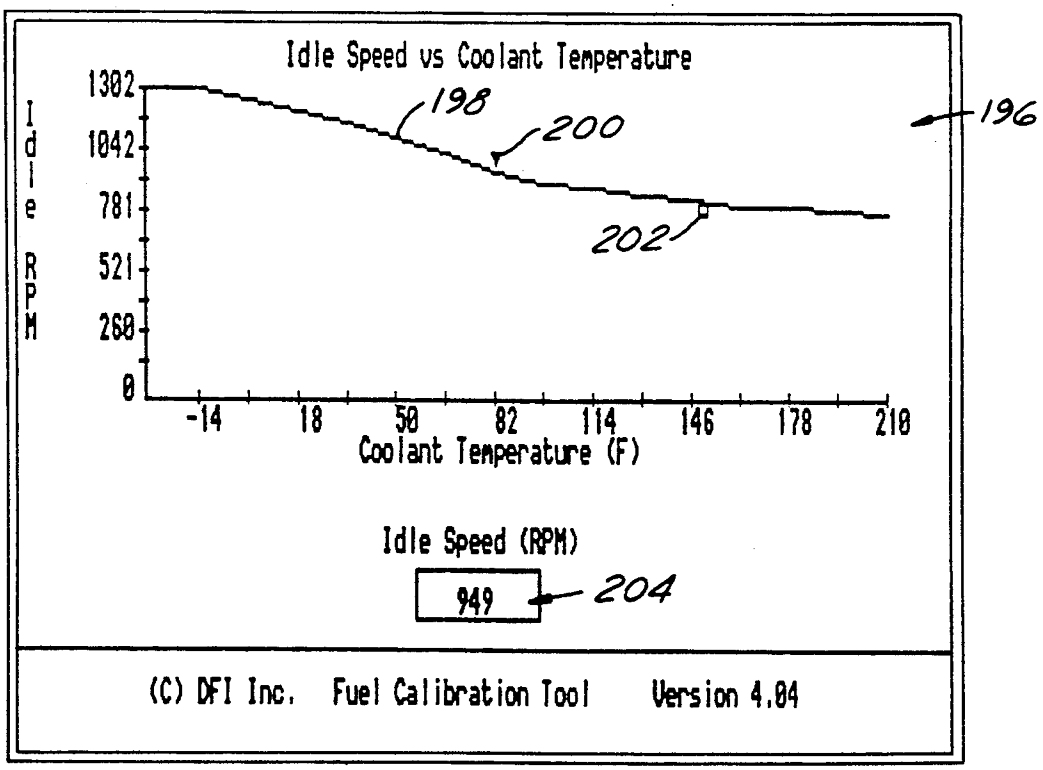
Figure 12:
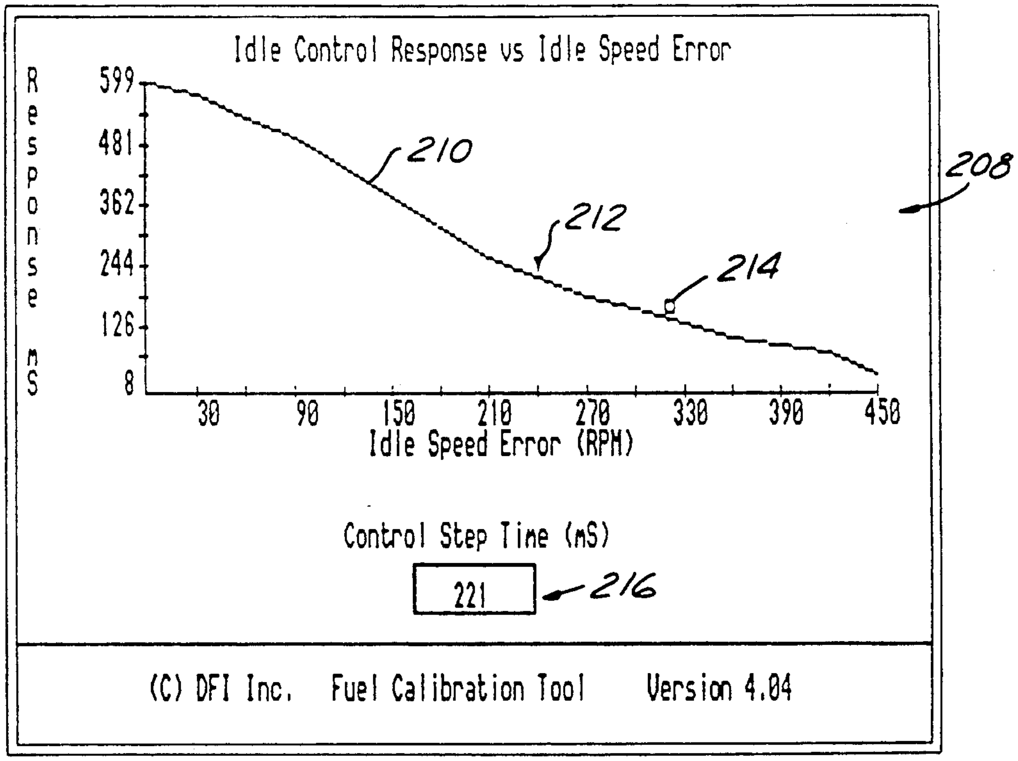

Returning to main menu 100 (FIGS. 3A and 4), the operator may select option 92 for viewing and editing the map for controlling the fuel injectors and supplying fuel during engine cranking (starting). Cranking fuel is the fuel needed to start the engine. Injector pulse width is proportional to engine coolant temperature. Selection of the fuel cranking option at main menu 100 brings up the fuel cranking sub-menu 176 (FIGS. 3A and 8). The operator may once again program the ECU cranking fuel table from a file, or save the current ECU cranking fuel table in a file. Each menu contains these options, which have been discussed hereinabove in conjunction with FIG. 5. The operator may also select option 178 to display and edit the cranking table from ECU EEPROM 72.

The cranking fuel table or map in ECU 22 is a two-dimensional table relating engine coolant temperature to injector pulse width, and is displayed at 180 (FIGS. 3A and 9) as a two-dimensional graph 181. The vertical axis is cranking pulse width in milliseconds, and the horizontal axis is engine coolant temperature in ° F. A pointer 182 is positionable along the graphic display using the left and right arrow keys. A box 184 intersects the graph at the point that corresponds to current engine operating conditions. Computer 20 continuously reads both starting coolant temperature and cranking pulse width from ECU 22, and updates the position of box 184 accordingly. A window 186 displays the pulse width at the intersection of pointer 182 and graph 181. As pointer 182 is moved in the horizontal direction, the corresponding pulse width in window 186 changes accordingly. Changes are made to this table by moving the pointer to the position on graph 181 at which a change is to be made, and then typing the new cranking pulse width value into keyboard 25. Graph 181 is redrawn to reflect the change when the ENTER key is depressed, and the revised table is downloaded at 189 (FIG. 3A) to ECU 22.

Returning to main menu 100 (FIGS. 3A and 4), option 86 selects the idle speed fuel map display and editing option. This allows monitoring and adjustment of the speed of engine idle through control of idle air bypass motor 56 (FIG. 1). An idle speed menu 190 (FIGS. 3A and 10) allows selection of programming from an existing file, or saving the current ECU idle speed table in a file. The third option 192 uploads at 194 (FIG. 3A) the current idle speed tables in ECU 22 and displays this table at 196 (FIGS. 3A and 11) as a two-dimensional graph 198. The vertical axis of graph 198 is engine speed and the horizontal axis is engine coolant temperature. Also present on graph 198 is a pointer 200 controlled by the left and right arrow keys, and a box 202 that indicates current engine operating conditions. A window 204 beneath graph 198 indicates idle speed at the point of intersection of pointer 200 and graph 198. Changes are made in the idle speed map in the same manner as described in detail hereinabove in conjunction with the cranking pulse width map in FIG. 9.

Selection of idle speed control response option 206 in menu 190 (FIG. 10) allows the operator to monitor the difference between the actual idle speed and the programmed idle speed of the engine. This portion of the program software allows adjustment of the speed at which the idle air control motor reacts to changes in idle speed. Upon selection of idle speed control response option 206 (FIG. 10), program computer 20 uploads the idle speed control tables from ECU and plots the idle speed control response in a screen display 208 (FIG. 12) as a two-dimensional graph 210 in which the vertical axis is the idle control response time in milliseconds per step in motor 56 (FIG. 1), and the horizontal axis is the error between the actual and programmed idle speeds. Display 208 also includes a wedge-shaped pointer 212 selectively positionable by the operator, and a box 214 that intersects graph 210 at the point of actual engine operation. A window 216 beneath graph 210 indicates response time in milliseconds at the point of intersection of pointer 212 and graph 210. Changes are made in the idle control response table or map displayed in FIG. 12 in the same manner as hereinabove discussed in conjunction with FIG. 9.

Figure 13:
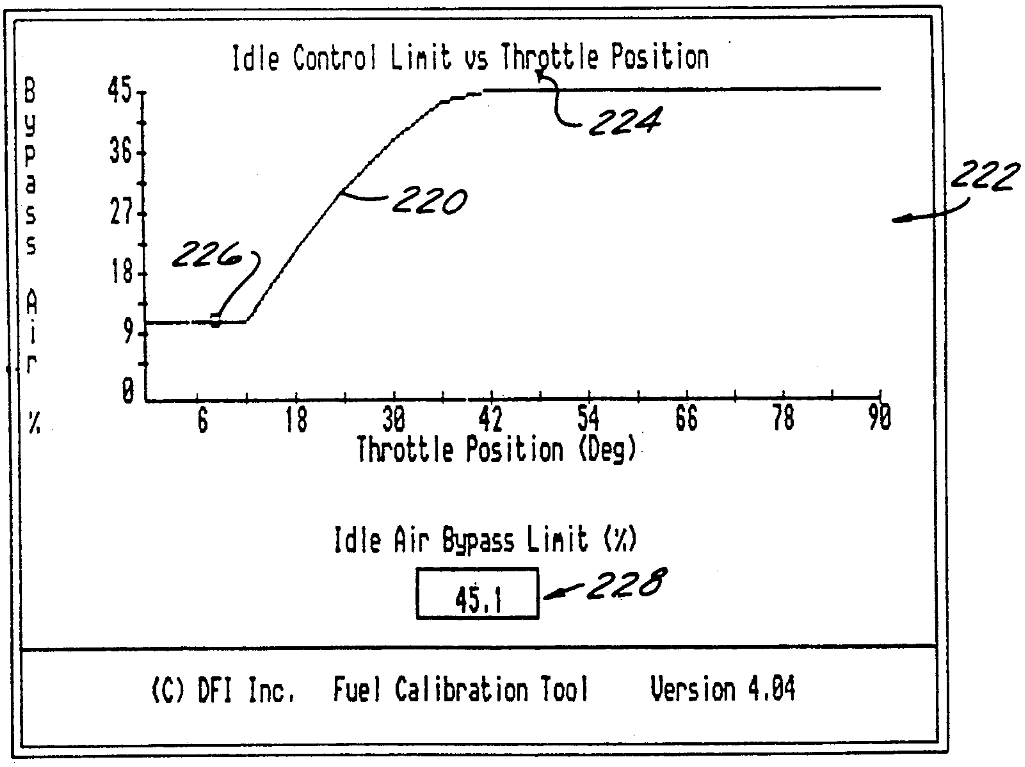
Figure 14:
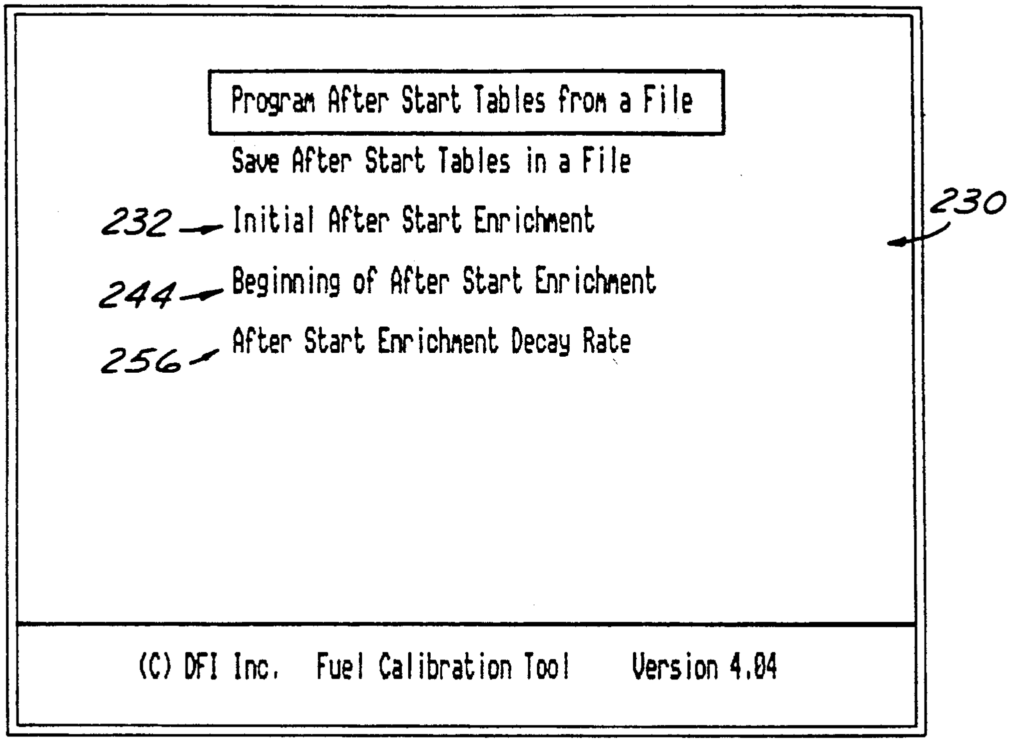
Figure 15:
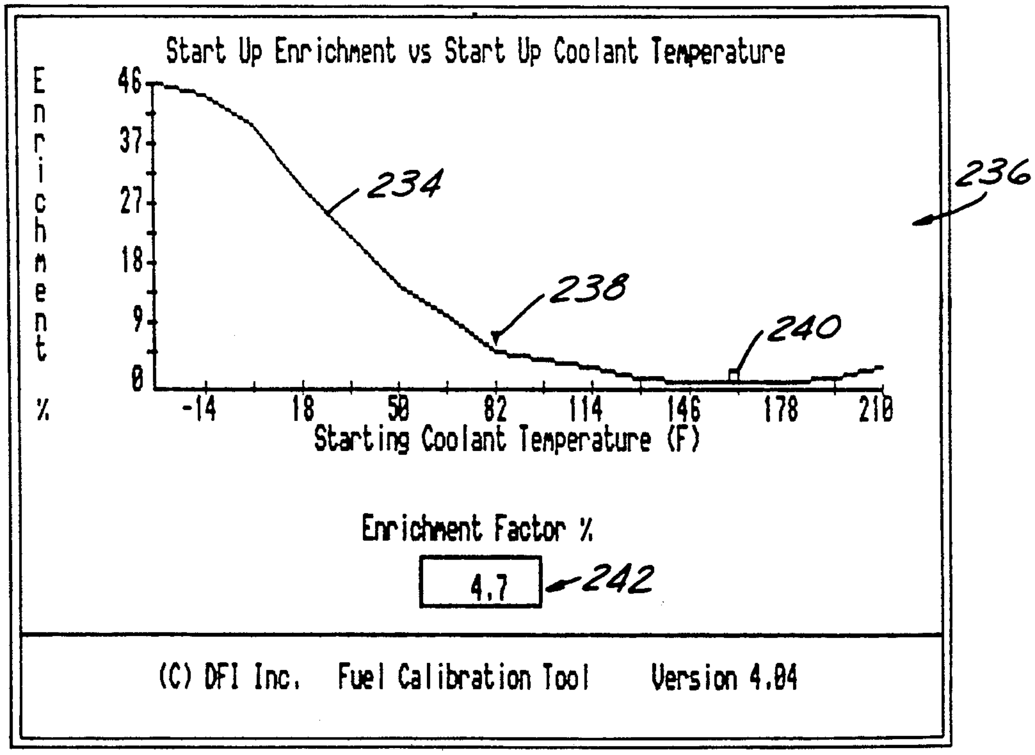

Returning to FIG. 10, selection of throttle follower option 218 at display 190 allows the operator to monitor the throttle position and idle bypass air of the engine, and to set the minimum limit of the bypass air. The purpose of the throttle follower table or map is to back the idle control mechanism away from its stop at the fully closed position, thereby leaking more air into the intake manifold at off-idle speeds to keep it from smothering the engine during rapid deceleration. Upon selection of throttle follower option 218 at display 190, program computer 20 reads all of the idle speed tables in ECU 22 and plots the two-dimensional graph 220 at display 222 (FIG. 13). The vertical axis in graph 220 is the amount of air bypassed around the throttle blades in percent, and the horizontal axis is throttle blade position in degrees of rotation. Throttle position is measured by throttle position sensor 34 (FIG. 1). Also present in display 222 is the wedge-shaped pointer 224 used for calibration purposes as previously described, the box 226 that intersects graph 220 at the point of current engine operating conditions, and the window 228 that indicates percent idle air bypass at the point of intersection between pointer 224 and graph 220. Changes are made in the table or map graphically illustrated at display 222 in the same manner as in display 180 hereinabove described in conjunction with FIG. 9.

Figure 16:
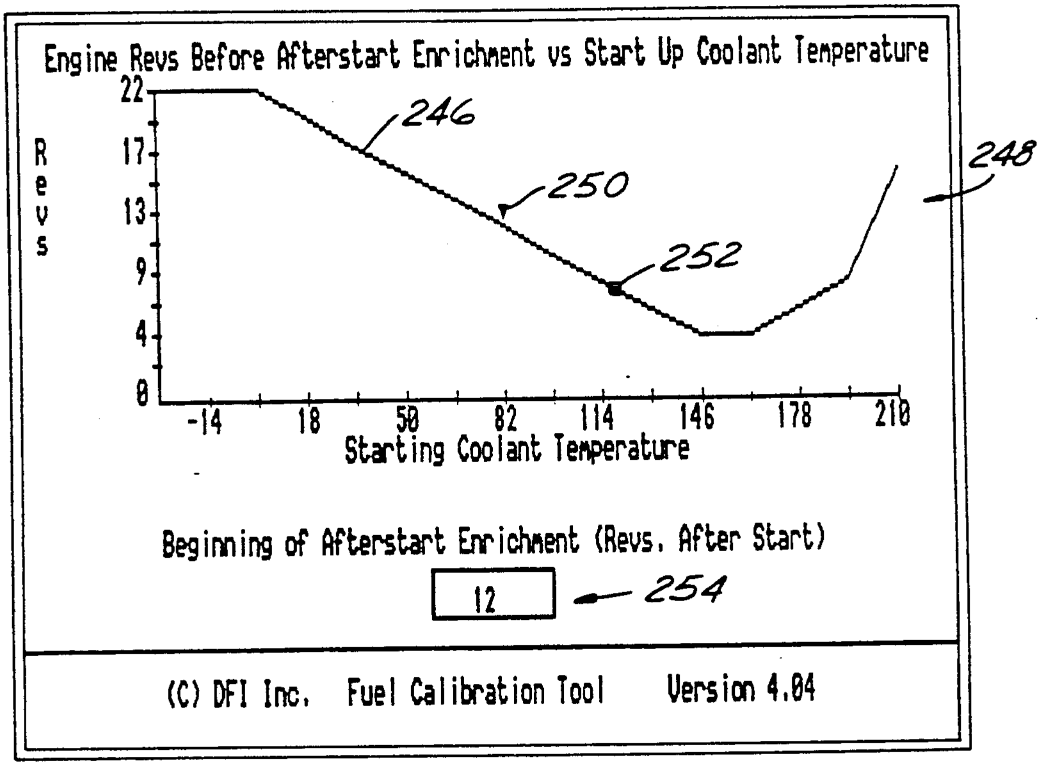
Figure 17:
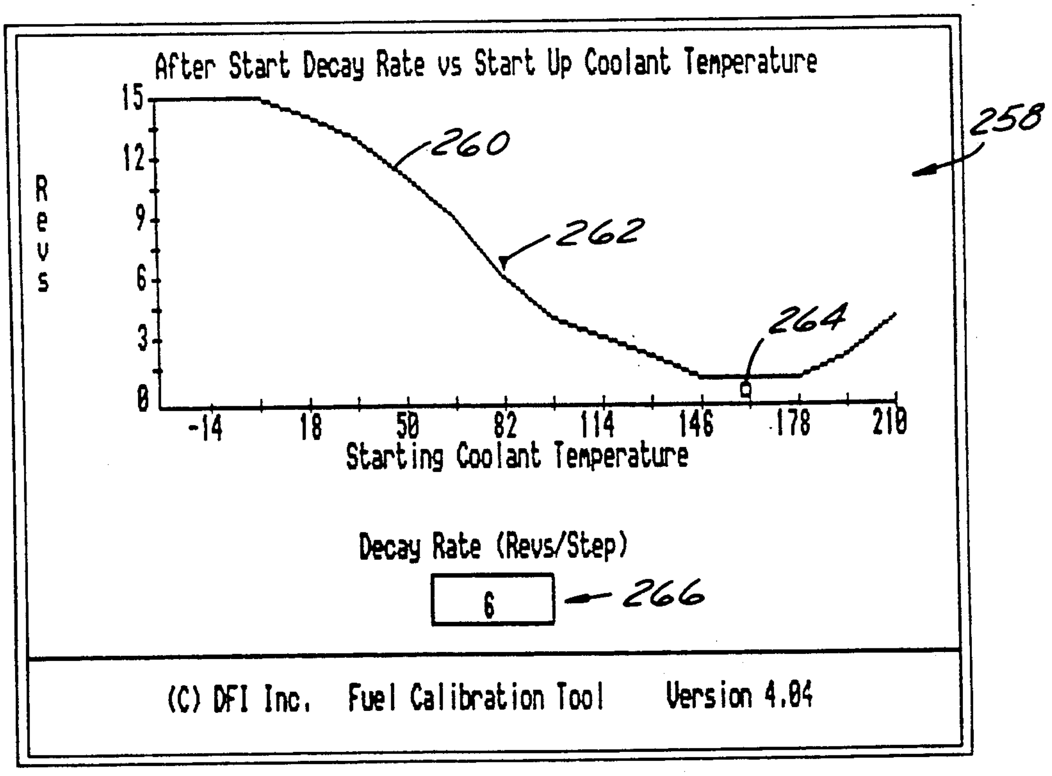

Returning to FIG. 4, selection of option 90 initiates after-start enrichment monitoring and editing operation. Selection of this option brings up sub-menu screen 230 (FIGS. 3A and 14), in which the operator may select to program the after-start tables from a pre-existing file, or to save the existing after-start tables in a new file. The initial after-start enrichment option 232 allows the operator to monitor and change the amount of after-start enrichment in the base fuel quantity delivered to the engine. When initial after-start enrichment option 232 is selected, programming computer 20 (FIG. 1) reads all after-start enrichment tables in ECU 22, and plots a two-dimensional graph 234 in a display 236 (FIG. 15) relating percent enrichment along the vertical axis to engine coolant temperature along the horizontal axis. Display 236 also includes a wedge-shaped pointer 238 selectively positionable by the operator, a box 240 that intersects graph 234 at the point of current engine operation, and a window 242 that indicates enrichment percentage at the point of intersection of pointer 238 and graph 234. Changes are made in this table in the same manner as in the table of display 180 (FIG. 9) hereinabove discussed. The enrichment percentage along the vertical axis of display 236 is added to the base pulse width obtained by ECU microprocessor 70 from the base fuel map (FIG. 6) in EEPROM 72. This enrichment factor is added after a certain number of revolutions as specified in a beginning of after-start fueling table (FIG. 16). Enrichment decays at a rate specified in an after-start fueling decay rate table (FIG. 17). Beginning and decay of after-start of enrichment is illustrated during operation by box 240. The after-start enrichment factor is intended to help overcome the initial start-up frictions and viscosities present in a cold engine, as well as to compensate for hot soak fuel vaporization in the fuel system of hot engines.

Beginning of after-start enrichment option 244 in after-start sub-menu 230 (FIG. 14) allows monitoring and change in the number of engine revolutions that occur after the engine starts before the initial after-start enrichment factor is added. Once again, upon selection of this option, all after-start tables are read from ECU 22, and a two-dimensional graph 246 is displayed at 248 (FIG. 16), along with the usual wedge 250 and box 252. The vertical axis of graph 246 is in revolutions of engine 28 (FIG. 1), and the horizontal axis is in ° F of coolant temperature. A window 254 indicates number of revolutions at the point of intersection of pointer 250 and graph 246.

After start enrichment decay rate option 256 at after-start sub-menu 230 (FIG. 14) allows the operator to monitor and change the number of engine revolutions that occur between each after-start enrichment factor decay step. Selection of option 256 loads all after-start tables from ECU 22 into programming computer 20. Screen 23 shows a display 258 (FIG. 17) of a two-dimensional graph 260 that relates the number of engine revolutions on the vertical axis to starting coolant temperature along the horizontal axis. A wedge-shaped pointer 262 is positionable by the operator for programming purposes, a box 264 indicates current engine operating conditions, and a window 266 indicates the decay rate in revolutions per step at the point of intersection of pointer 262 and graph 260.

Figure 3A:
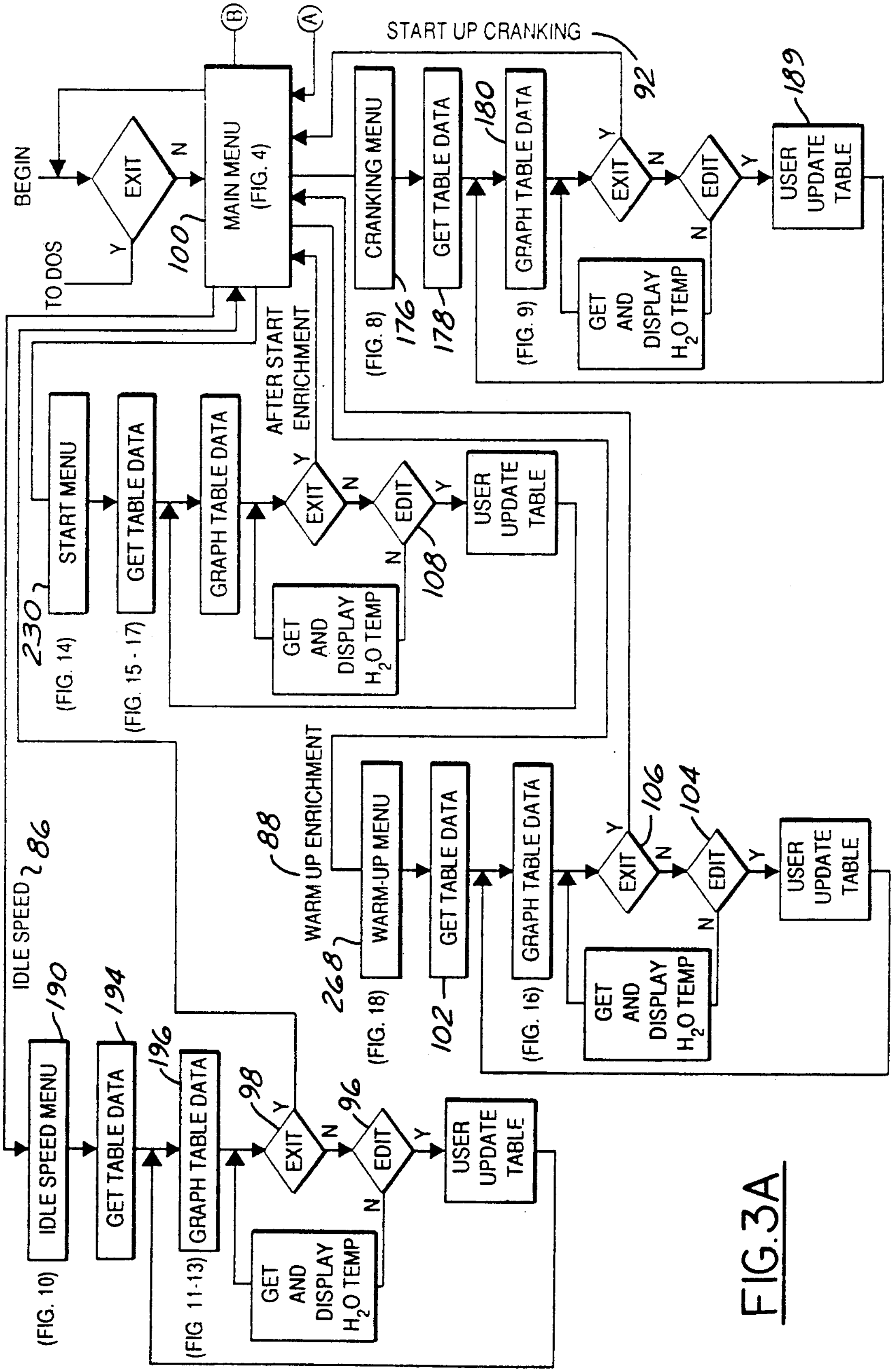
FIGS. 3A and 3B together comprise a flow chart that illustrates operation of the control table reprogramming apparatus in FIG. 1.
Figure 3B:
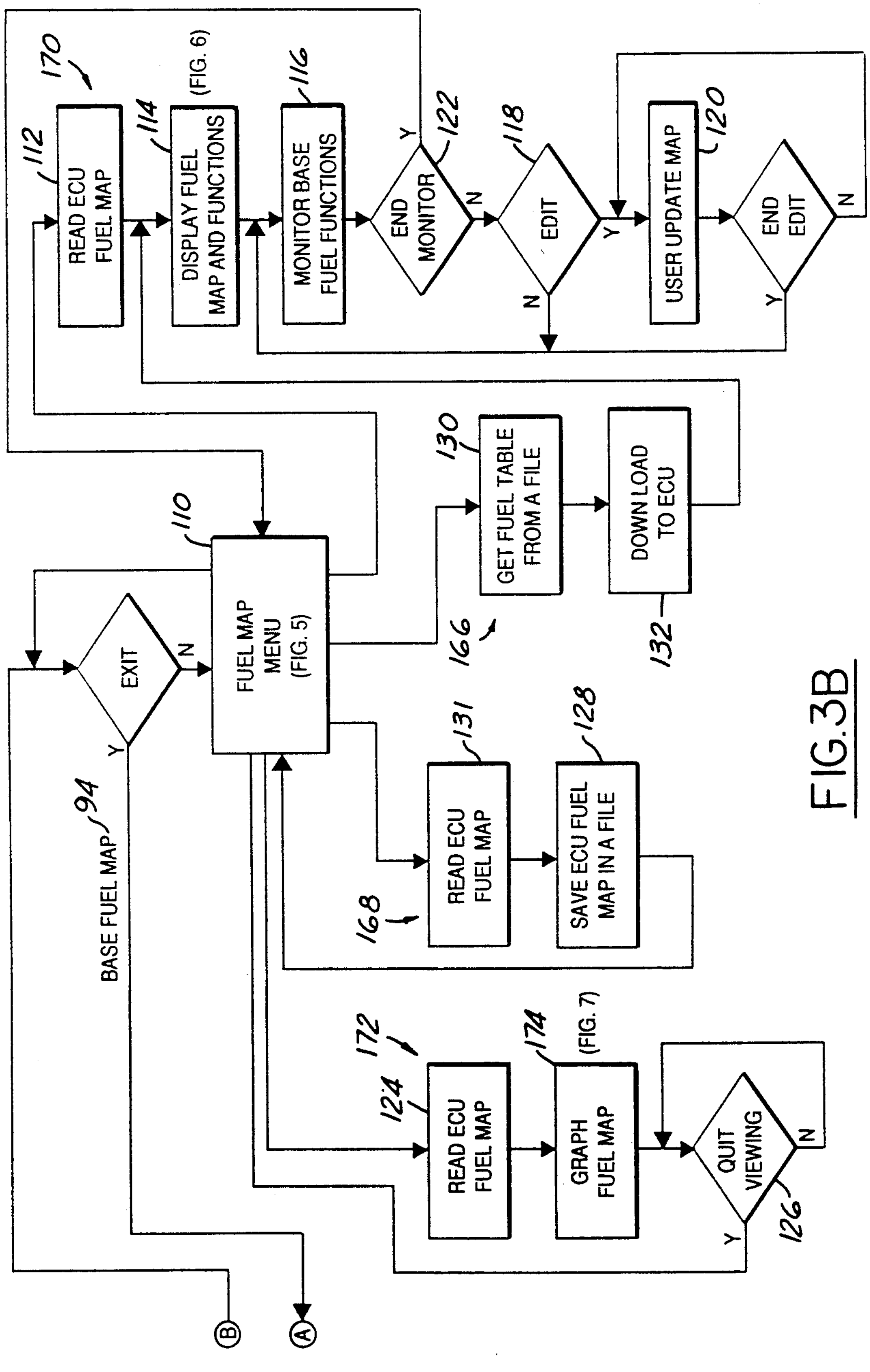
Figure 18:
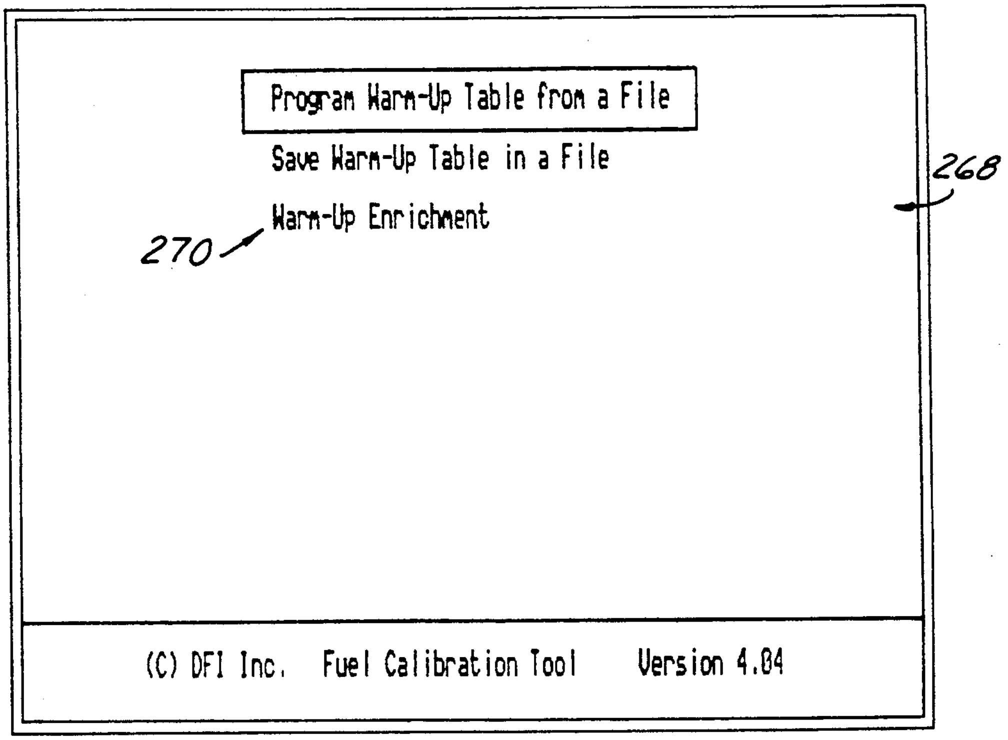
Figure 19:
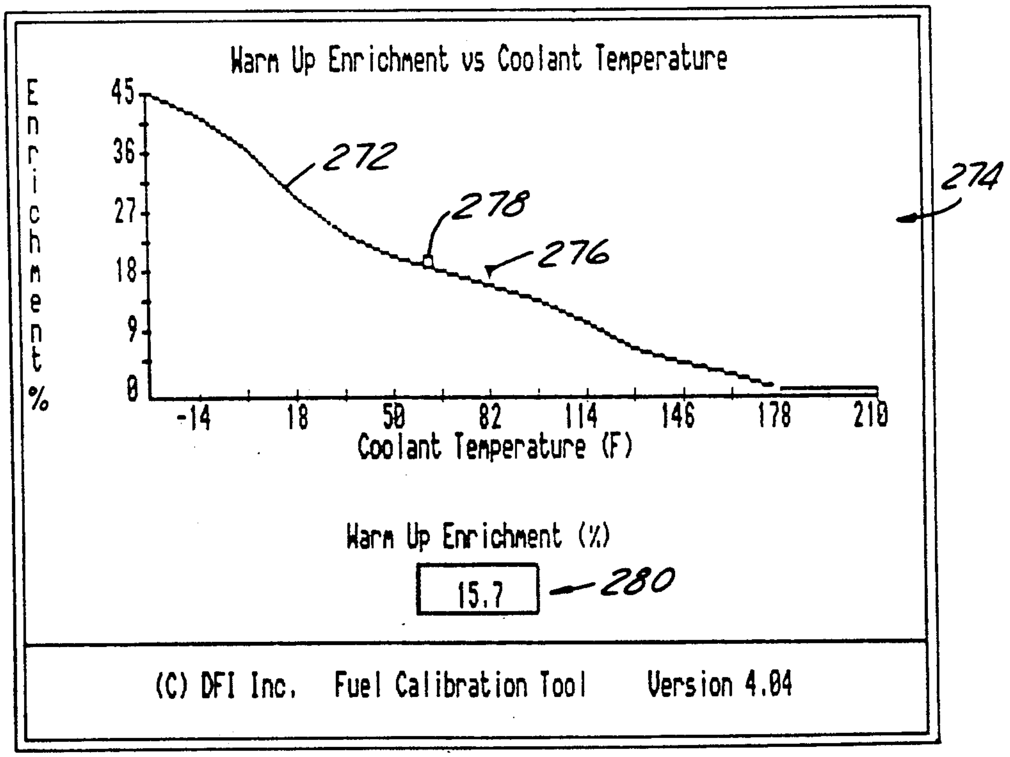

Selection of warm-up enrichment option 88 (FIGS. 3A and 4) brings up the warm-up enrichment sub-menu 268 (FIGS. 3A and 18). Warm-up enrichment tables can be programmed from an existing file or saved to a new file. Selection of the third option 270 allows the operator to monitor and change the amount of warm-up enrichment from the base fuel map in fuel delivered to the engine. When this option is selected, the warm-up enrichment table in ECU is read and plotted as a two-dimensional graph 272 in a display 274 (FIG. 19). The vertical axis in graph 272 is warm-up enrichment in percent and the horizontal axis is engine coolant temperature. An operator-positionable pointer 276 facilitates change in enrichment values, a box 278 intersects graph 272 at the point of current engine operation, and a window 280 indicates the percent of fuel enrichment at the point of intersection of pointer 276 and graph 272. This table contains enrichment factors that increase the fuel delivered to the engine during warm-up based on engine coolant temperature.

Figure 20:
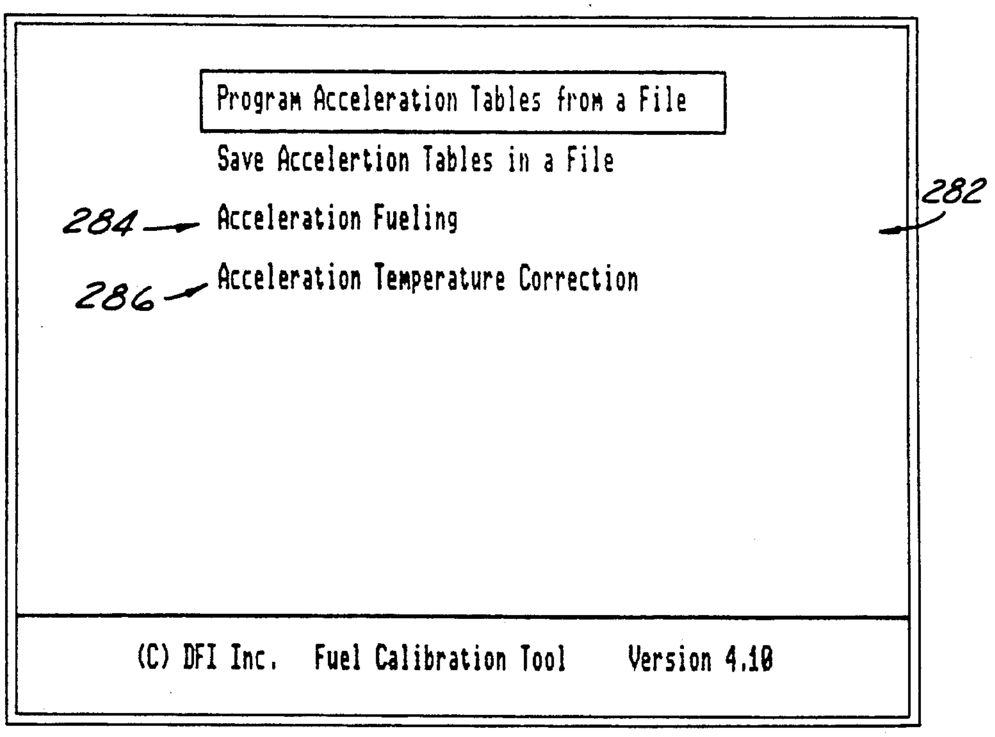
Figure 21:
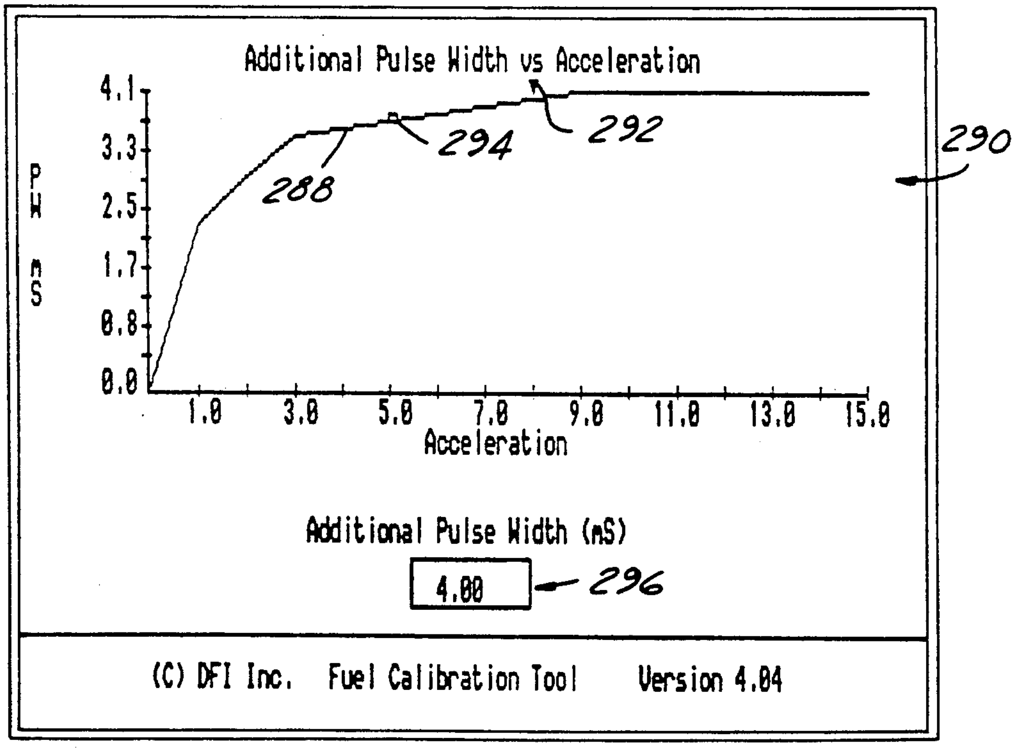
Figure 22:
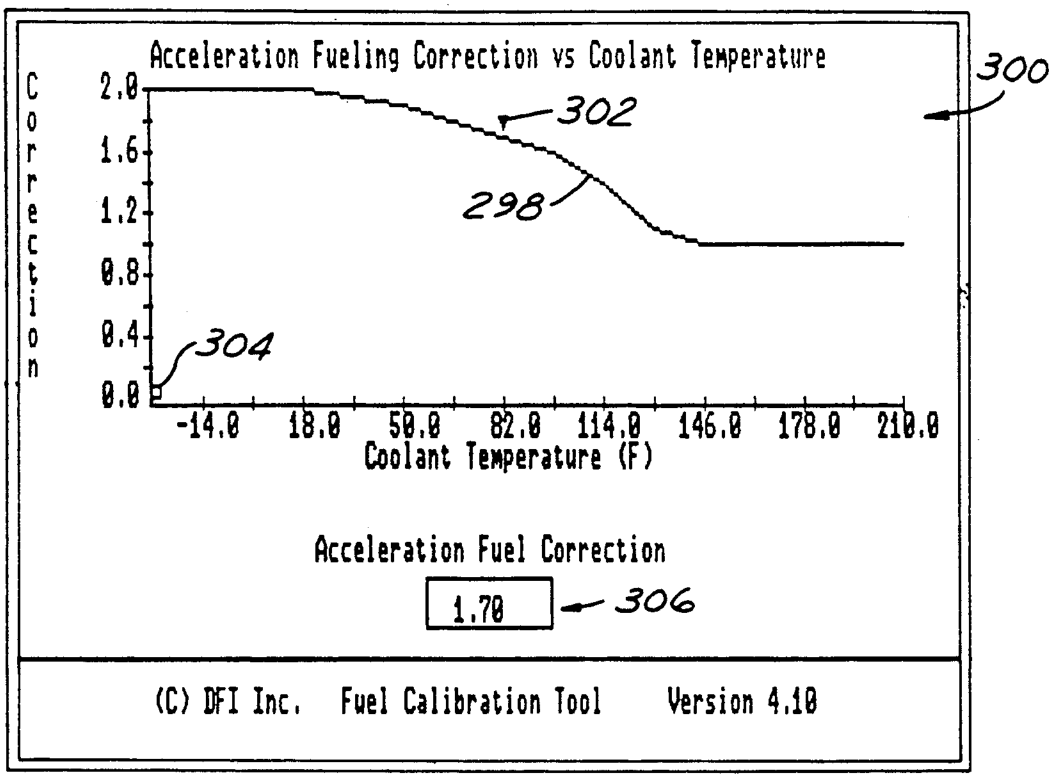

Selection of acceleration fuel enrichment option 160 in main menu 100 (FIG. 4) brings up an acceleration enrichment sub-menu 282 (FIG. 20). Acceleration fuel enrichment tables may be obtained from or stored in a file. Alternatively, the operator may select either acceleration fueling enrichment 284 or acceleration temperature correction 286. Acceleration enrichment 284 allows the operator to monitor and change the amount of acceleration enrichment that is added to the base fuel map during engine acceleration. When this option is selected, the acceleration enrichment tables in ECU 22 are uploaded, and a two-dimensional graph 288 (FIG. 21) is plotted and displayed at 290 to relate additional pulse width in milliseconds along the vertical axis to acceleration measured in rate of change at throttle position sensor 34 (FIG. 1). Also present in display 290 are the usual pointer 292 for charge or programming purposes, box 294 and window 296.

Selection of acceleration temperature correction option 286 at acceleration enrichment sub-menu 282 (FIG. 20) allows the operator to monitor and change the amount of additional fuel delivered to the engine, when an acceleration is requested by the operator and sensed at throttle position sensor 34 (FIG. 1), as a function of coolant temperature. In a simultaneous double-fire engine fuel delivery system, fuel is delivered once per crankshaft revolution. Injector pulses are synchronous with the trigger input from the engine tachometer. If the throttle is opened abruptly, synchronous fuel delivery is typically insufficient, and the engine may hesitate or backfire. To overcome this problem, additional fuel pulses are delivered between the synchronous pulses. This is termed asynchronous fueling in the art because the additional fuel is not synchronized with the tachometer signal. When the engine is cold, transient response is greatly improved by the addition of asynchronous fuel, while at hotter engine temperatures asynchronous fuel tends to over fuel the engine. Thus, when acceleration temperature correction option 286 is selected at acceleration enrichment sub-menu 282, all acceleration enrichment tables in ECU 22 are read, and a two-dimensional graph 298 (FIG. 22) is computed and displayed at 300 to illustrate a correction factor, which is a number by which both synchronous and asynchronous pulse widths are multiplied during acceleration, versus engine coolant temperature. Display 300 also includes the usual wedge-shaped pointer 302, box 304 and window 306.

Figure 4:
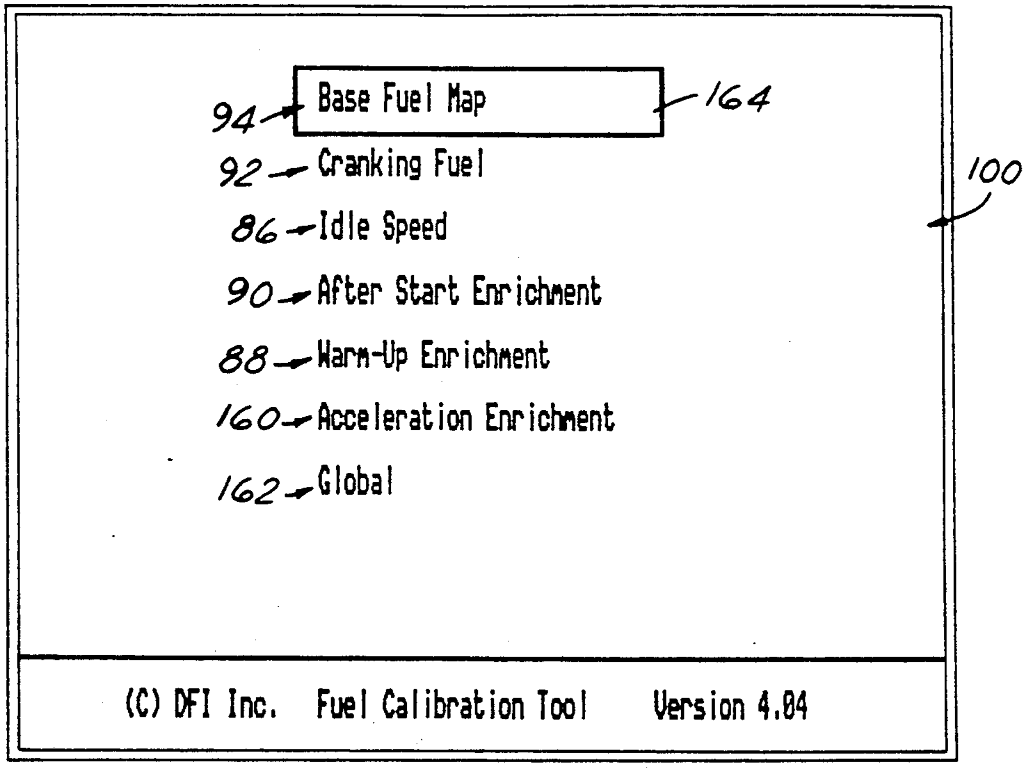
FIGS. 4–5, 8, 10, 14, 18, 20 and 23 illustrate various menus that appear on the apparatus display screen during operation of the invention.
Figure 5:
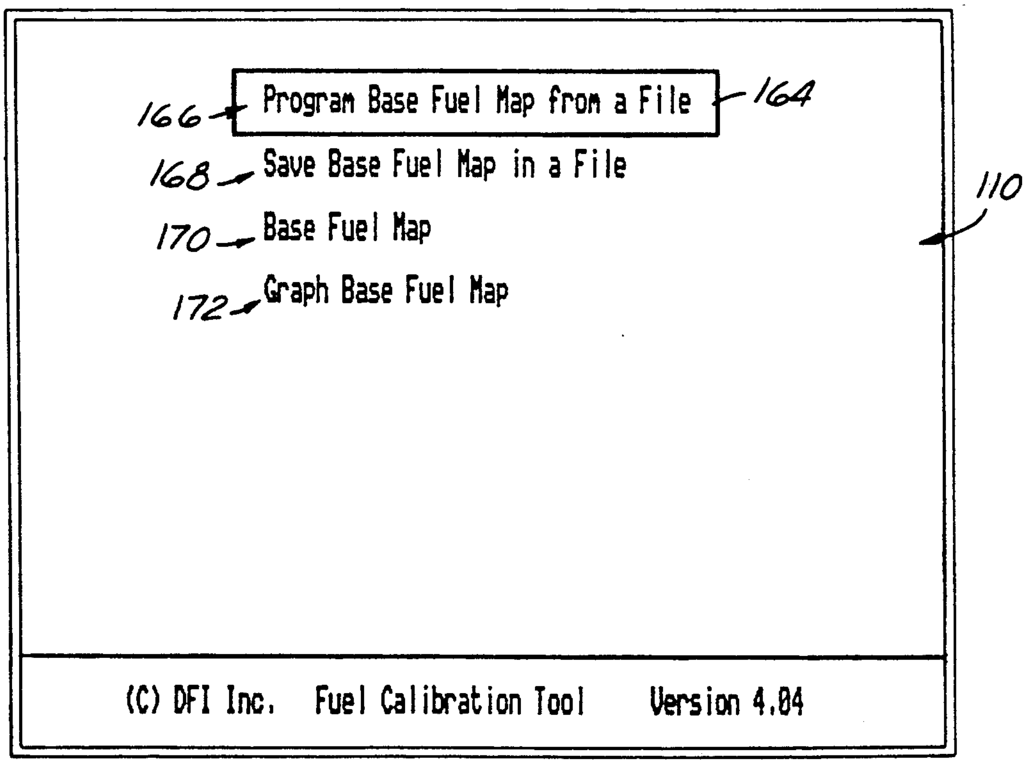
Figure 23:
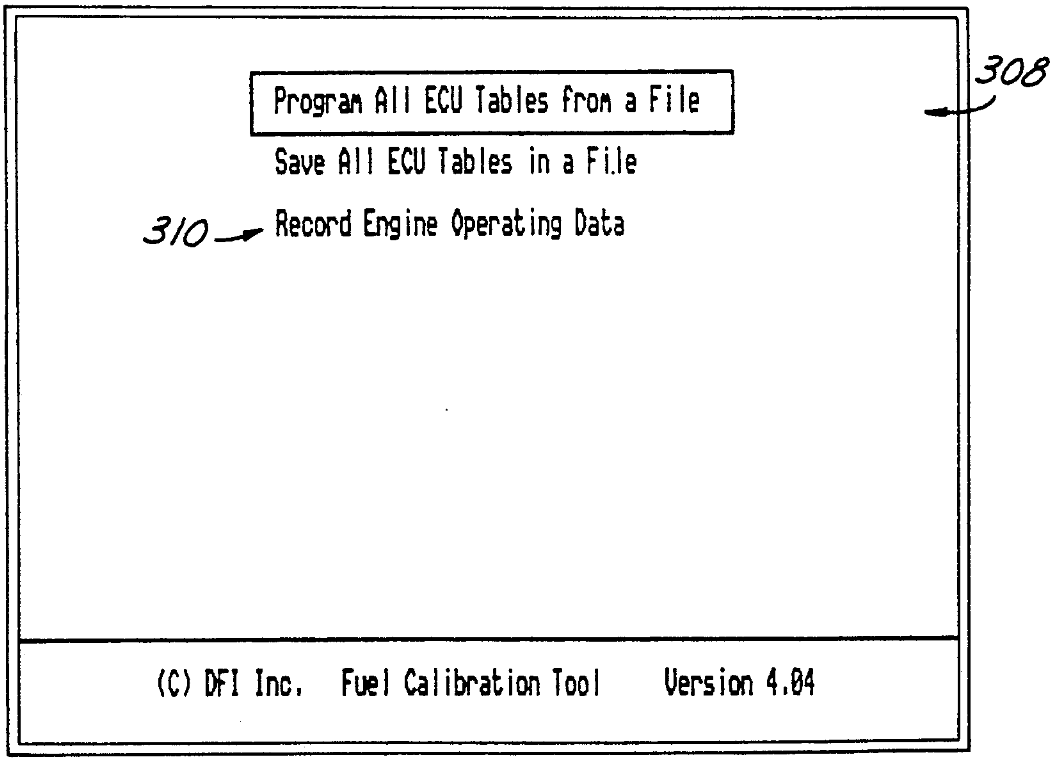
Figure 24:
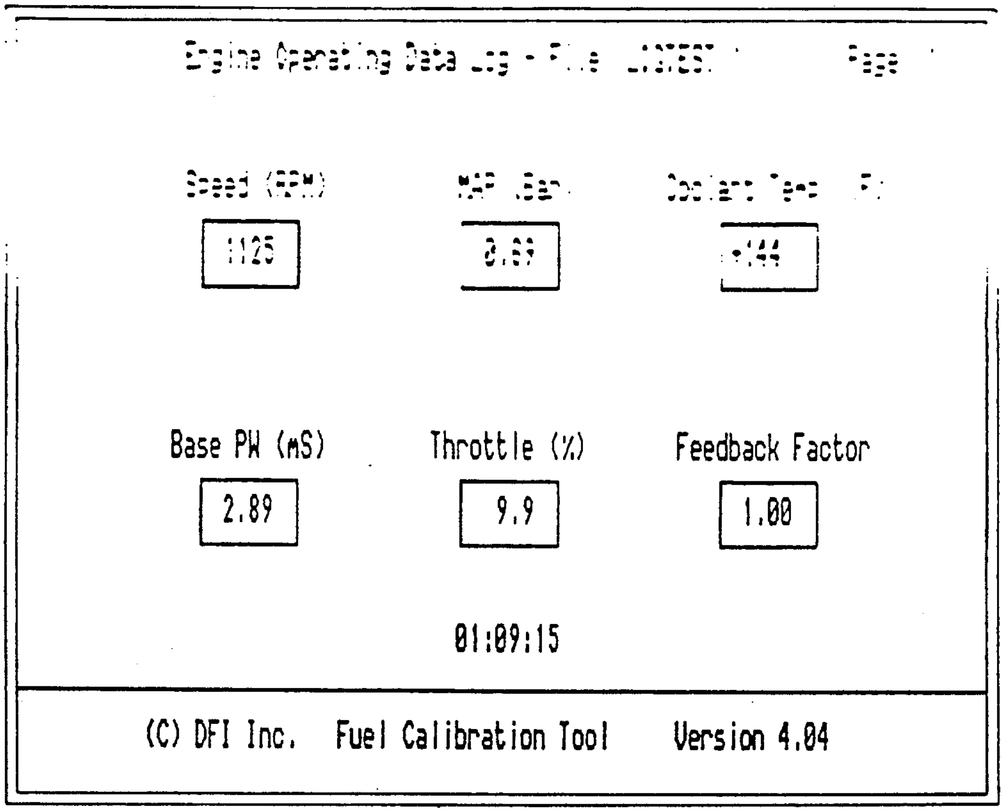
FIG. 24 illustrates display of engine operating data on the apparatus screen during another mode of operation of the invention.

Returning to main menu 100 in FIG. 4, selection of the global option 162 brings up the global sub-menu 308 (FIG. 23). This sub-menu allows the operator in one operation to program all tables in ECU 22 from existing files in programming computer 20, to save all existing ECU tables in a new file, and to record engine operating data by selection of menu option 310. Selection of this option displays engine operating conditions (FIG. 24) at screen 23, and simultaneously logs operating data in a memory file for later display or print out.

Figure 25:
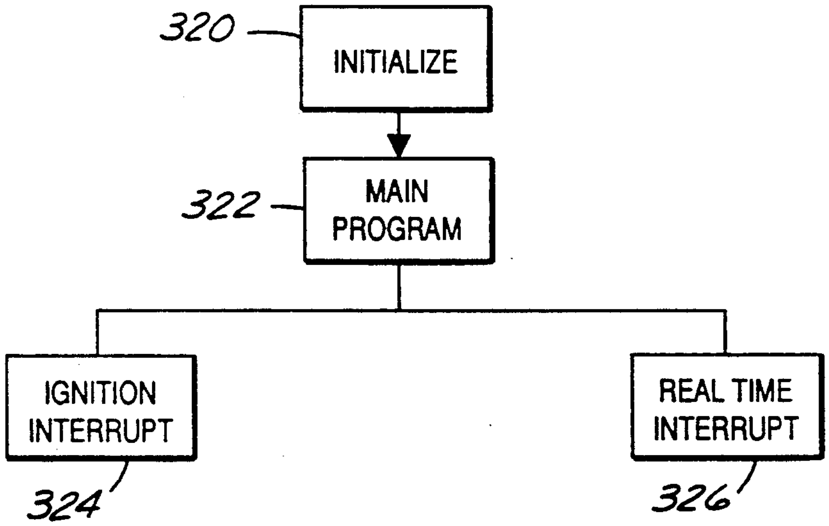
FIG. 25 is a flow chart that illustrates operation of the engine ECU in FIGS. 1 and 2.

FIGS. 25–27 illustrate operation of ECU 22 as it relates to non-disruptive communications with programming computer 20 in accordance with the present invention. FIG. 25 illustrates the major program modules of the ECU fuel control strategy. The initialization module 320 is entered when the ECU is first connected to battery power 30 (FIG. 1) and six seconds after no ignition interrupts have been received. The function of this module is to prepare control variables in ECU 22 and controlled mechanisms 29 for an engine starting operation, and to wait for a cranking signal. The main program module 322 monitors engine 28 during operation. Ignition pulses from sensor 48 (FIG. 1) are monitored to determine the existence of a starting or running condition. The ignition interrupt module 324 performs all non-real-time dependent calculations and functions, such as injector pulse control and RPM determination. The real time interrupt module 326 is assigned a lesser priority than the ignition interrupt module, and is entered at fixed time intervals to perform functions that rely upon a fixed frequency reference. These functions include input signal sampling and filtering, idle control motor response time calculations, and serial communications synchronization.

FIG. 26 illustrates the flow of program execution in ignition interrupt module 324 as it relates to the non-disruptive operation of fuel delivery while programming one or more fuel delivery maps or tables. Under various operating conditions, such as acceleration conditions previously discussed, it is necessary to alter the rate at which fuel is delivered from the simultaneous double-fire method of fuel injection normally employed. For this reason, fueling mode is first determined at 328. Steady state operation is illustrated in FIG. 26 for purposes of discussion. The last calculated pulse width value Tpw is then loaded at 330 from its storage register into a injector pulse timer, and the injector driver 78 (FIG. 2) is energized by the timer for this time period. Table look-ups and calculations based on sensor inputs are then performed at 332 to determine variable values that affect the fuel delivery requirements of the engine. These variables include not only the base injector pulse width from matrix 144 (FIG. 6), but also start-up or warm-up enrichment factors (FIGS. 15 and 19), for example. The variables are then combined at 334 in a first order equation to yield a total injector pulse width Tpw. The status of an EEPROM program register is then read at 336 and, if the EEPROM 72 (FIG. 2) is not being erased or reprogrammed, the pulse width Tpw calculated at 334 is saved at 338 for the next injection. Otherwise, the new value of Tpw is not saved, and the value obtained from the last calculation prior to erasure or reprogramming of the EEPROM is employed in the next injection. Other rotation-dependent functions are performed at 340, and operation returns to the main program module 322 (FIG. 25) pending receipt of the next interrupt.

Figure 27A:
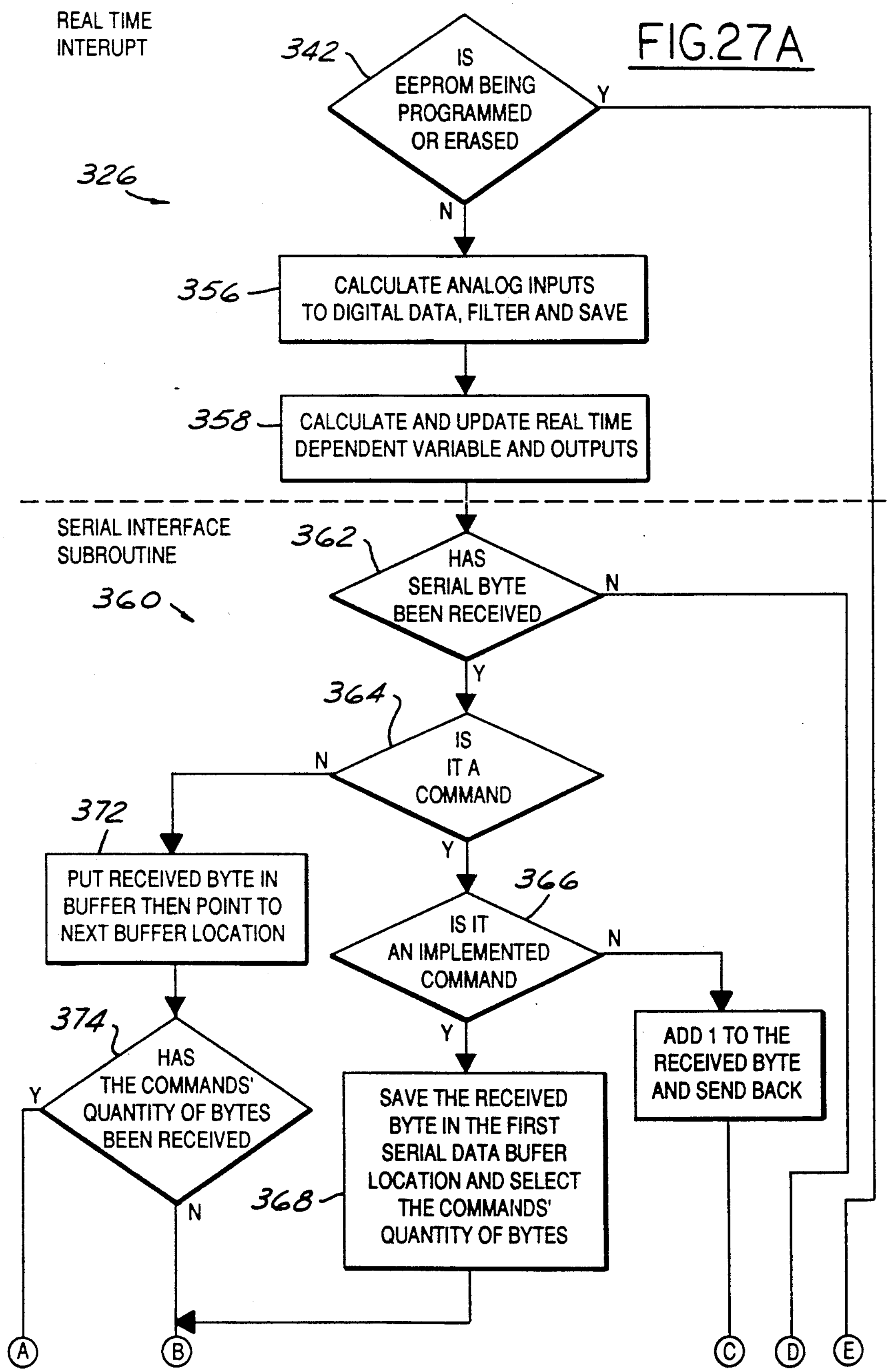
FIGS. 27A and 27B together constitute a flow chart that illustrates operation of the real-time interrupt and serial interface subroutines in the ECU.
Figure 27B:
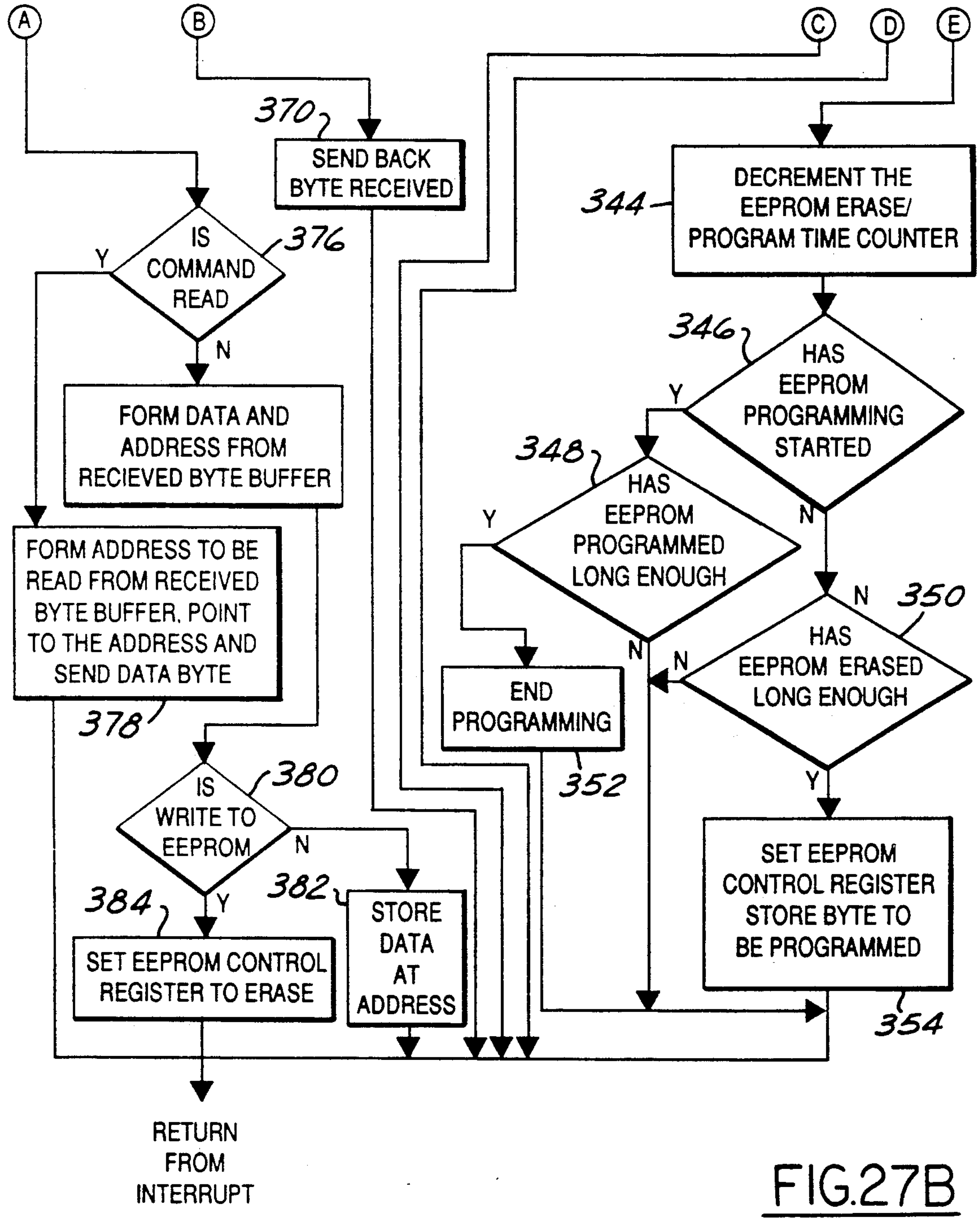

FIGS. 27A and 27B illustrates flow of operations in real time interrupt 326. Initially, EEPROM programming status is tested at 342. IF the EEPROM is being erased or reprogrammed, only the timer that controls the erasure and reprogramming of the EEPROM is updated at 344 and tested at 346 for EEPROM erasure/programming control. None of the normal real time interrupt functions are performed during erasure and programming of the EEPROM to eliminate EEPROM table access required by some of the normal real time interrupt routines. Hence, all of the functions performed and variables determined in the remainder of the real time interrupt module are frozen at their last values prior to EEPROM erasure/programming, except EEPROM programming variables. The programming and/or erasure counters are tested at 348, 350, the EEPROM program/erasure status registers are updated at 352, 354 as appropriate, and operation returns to main program module 322 (FIG. 25).

If the ECU EEPROM is not being programmed or erased, the analog sensor inputs are sampled, filtered and stored at 356, and real-time-dependent variables and outputs are calculated and set at 358. The serial interface subroutine 360 is then entered to control communications between ECU 22 and programming computer 20 along cable 24 through interface 26 (FIG. 1). The serial receiver status is checked at 362. If a byte has been received, it is tested at 364 for command or data status. If an implemented command has been received at 366, the buffer size that holds the incoming data to follow is initialized at 368. Data arriving at the serial port is stored in this buffer as it arrives, and is then interpreted, based on command, after all of the data has been received. Command execution in the ECU does not begin until all of the data has been received for the particular command.

For every byte sent to the ECU, the ECU sends a byte back at 370, creating a software handshake. In this way, data collision and buffer overrun errors are eliminated. Echoed data is also inspected for correctness to eliminate communication link errors. If the byte is determined at 364 not to be a command byte, it is interpreted as a data byte and placed at 372 in the appropriate buffer. If additional data bytes are expected at 374, the echo byte is returned at 370. On the other hand, if all data bytes have been received at 374, and if the command is determined at 376 to be a read command, data at the address indicated by the data byte is read and transmitted at 378 to the external programming computer. If the command is not a read command at 376, it is interpreted as a write command, in which event it must be tested at 380 for whether the write command is to the EEPROM. If not, data is stored at 382 the appropriate address, and operation returns to the main program. On the other hand, if the write is to the EEPROM, the EEPROM control register is set at 384, and operation returns to main program module 322.

I claim:

1. An engine control system that comprises:

an engine including at least one mechanism responsive to electronic control signals for affecting engine operation and at least one sensor for supplying electrical sensor signals as a function of engine operating conditions, an electronic control unit including an electronic memory storing engine control parameters in at least one lookup table, means for periodically addressing said memory and obtaining said control parameters as a function of said sensor signals, and means for supplying said control signals to said mechanism as a predetermined function of said control parameters, and means for selectively varying said control parameters in said table including means for initiating a memory-programming mode of operation, means for inhibiting said periodically-addressing means during said memory-programming mode of operation, and means for employing control parameters obtained from said table prior to said memory-programming mode of operation to supply said control signals during said mode of operation such that engine operation continues during said memory-programming mode of operation.

2. The system set forth in claim 1 wherein said selectively-varying means comprises means for reading said table from said electronic memory, means for displaying said table to an operator, means responsive to an operator for identifying specific parameters in said table, means for selectively varying said specific parameters in said table, and means responsive to the operator for downloading said specific parameter varied by the operator into said table stored in said electronic memory.

3. The system set forth in claim 2 wherein said table-displaying means includes means coupled to said electronic control unit and responsive to said sensor signals for displaying current operating conditions at the engine.

4. The system set forth in claim 3 wherein said displaying means comprises a screen for displaying said table in alphanumeric tabular format as a function of engine operating conditions, wherein said identifying means comprises means forming a cursor on said screen and means for selectively moving said cursor on said screen so as to overlie parameter entries in said table on said screen, and wherein said selectively-varying means comprises means for selectively varying the parameter entry that said cursor overlies.

5. The system set forth in claim 4 wherein said selectively varying means comprises an alphanumeric keyboard.

6. The system set forth in claim 3 wherein said displaying means comprises a screen for displaying said table in graphic format as a function of engine operating conditions, wherein said identifying means comprises means forming a cursor on said screen and means for selectively moving said cursor on said screen along said graphic format display, and wherein said selectively-varying means comprises means for selectively varying the parameter entry at the intersection of said cursor and said graphic display.

7. The system set forth in claim 1 for controlling delivery of fuel to the engine wherein said mechanism comprises at least one electronic fuel injector, wherein said at least one sensor includes a first sensor for providing a signal as a function of engine speed and a second sensor for providing a signal as a function of engine air manifold pressure, and wherein said at least one look-up table comprises a first table containing a plurality of injector pulse width control parameters addressable as a function of engine speed and air manifold pressure.

8. The system set forth in claim 7 wherein said at least one sensor further includes a third sensor for providing a signal as a function of engine operating temperature, and wherein said at least one look-up table comprises a second table of parameters addressable as a function of engine temperature for modifying parameters read from said first table.

9. An electronic control system for an internal combustion engine that includes:

an engine having at least one mechanism responsive to electronic control signals for affecting operation of the engine and at least one sensor for supplying electrical sensor signals in real time as a function of operating conditions at the engine, an electronic control unit including memory means having prestored wherein at least one look-up table of engine control parameters addressable as a function of engine condition signals, microprocessor-based control means including means for receiving said sensor signals, means for addressing said memory to obtain control parameters from said table as a function of said sensor signals, and means for generating said control signals to said mechanism as a preselected function of said control parameters, and means for selectively reprogramming said table comprising means for selectively reading and temporarily storing said table, means for displaying said table to an operator, means on said displaying means responsive to an operator for selectively identifying specific parameter entries in said table to be varied, means for varying said specific entries on said displaying means and in said temporarily-storing means, and means for downloading parameter entries varied by the operator into said memory table, said control means including means for employing said look-up table in said memory means to continue operation of the engine during reprogramming of said table.

10. The system set forth in claim 9 wherein said displaying means comprises a screen for displaying said table in alphanumeric tabular format as a function of engine operating conditions, wherein said identifying means comprises means forming a cursor on said screen and means for selectively moving said cursor on said screen so as to overlie parameter entries in said table on wherein said screen, and said selectively-varying means comprises means for selectively varying the parameter entry that said cursor overlies.

11. The system set forth in claim 10 wherein said selectively varying means comprises an alphanumeric keyboard.

12. The system set forth in claim 9 wherein said displaying means comprises a screen for displaying said table in graphic format as a function of engine operating conditions, wherein said identifying means comprises means forming a cursor on said screen and means for selectively moving said cursor on said screen along said graphic format display, and wherein said selectively-varying means comprises means for selectively varying the parameter entry at the intersection of said cursor and said graphic display.

13. The system set forth in claim 9 wherein said table-displaying means includes means for displaying current operating conditions at the engine.

14. In a method of controlling operation of an engine that comprises the steps of:

(a) storing an electronic table of engine control parameters as addressable functions of engine operating conditions, (b) monitoring operating conditions at the engine, (c) periodically addressing said table as a function of said conditions to obtain at least one control parameter associated with current operating conditions at the engine, and (d) controlling at least one mechanism associated with the engine affecting operation at the engine as a function of said at least one control parameter associated with said current operating conditions, the improvement for selectively varying parameters in said table without interrupting operation at the engine comprising the steps of:

(e) detecting a mode of operation in which parameters in said table are to be varied, (f) upon onset of said mode of operation, storing the at least one control parameter obtained in said step (c) and thereafter inhibiting said step (c) during duration of said mode of operation, and (g) employing in said step (d) said parameter stored in said step (f) during said mode of operation.

15. The method set forth in claim 14 comprising the additional steps during said mode of operation of:

(h) displaying said table in its entirety to an operator, (i) variably indicating display table locations at which parameters may be varied, (j) varying parameters at said display table locations indicated in said step (i) under control of the operator, (k) loading parameters varied in said step (j) into said electronic table at associated table locations, and then (l) terminating said mode of operation.

16. An electronic system for controlling fuel delivery to an internal combustion engine having at least one electronic fuel injector and a plurality of sensors for providing electronic sensor signals that vary as functions of operating conditions at the engine, said system comprising:

an electronic memory having a multiplicity of injector pulse width control parameters prestored therein as a look-up table addressable as a function of said sensor signals, means for selectively varying said parameters in said table comprising means for displaying the entire said table to an operator, means on the display responsive to an operator for selectively identifying a table location at which the associated parameter is to be varied, means for selectively varying said associated parameter to a modified parameter on said display, and means responsive to the operator for replacing said associated parameter at said table location with said modified parameter, and an electronic controller including means for receiving said sensor signals, means for addressing said table as a function of said sensor signals to obtain a first pulse width control parameter associated with current operating conditions at the engine, means responsive to said selectively-varying means and to said parameter replacing means to store said first parameter and inhibit addressing of said table while said table parameters are being varied, and means for energizing said injector for a time duration that varies as a function of said first parameter.

17. The system set forth in claim 16 wherein said table-displaying means includes means responsive to said sensors for displaying current operating conditions at the engine.

18. The system set forth in claim 17 wherein said table comprises a three-dimensional first table of parameters by engine speed and engine air manifold pressure.

19. The system set forth in claim 18 wherein said sensors include an oxygen sensor responsive to engine exhaust, wherein said means for displaying current operating conditions including means responsive to said oxygen sensor for displaying current air/fuel ratio information, and wherein said table-displaying means comprises a screen and means for displaying said first table and said air/fuel ratio information in separate display windows on said screen.

20. The system set forth in claim 19 wherein said table further comprises a two-dimensional second table of parameters by engine operating temperature, and wherein said table-displaying means comprises means for selecting between said first and second tables for display and modification at said screen.

21. The system set forth in claim 20 wherein said table-displaying means comprises means for displaying said second table in graphic format, wherein said identifying means comprises means forming a cursor on said screen and means for selectively moving said cursor on said screen along said graphic format display, and wherein said selectively-varying means comprises means for selectively varying the parameter entry at the intersection of said cursor and said graphic display.

22. The system set forth in claim 20 wherein said table-displaying means comprises means for displaying said first table in alphanumeric tabular format as a function of engine speed and air manifold pressure, wherein said identifying means comprises means forming a cursor on said screen and means for selectively moving said cursor on said screen so as to overlie parameter entries in said table on said screen, and wherein said selectively-varying means comprises means for selectively varying the parameter entry that said cursor overlies.

23. The system set forth in claim 22 wherein said selectively varying means comprises an alphanumeric keyboard.

* * * * *